(12) United States Patent
Chastain et al.

(10) Patent No.: US 10,892,948 B2
(45) Date of Patent: *Jan. 12, 2021

(54) CREATING AND USING SERVICE CONTROL FUNCTIONS

(71) Applicant: AT&T Intellectual Property I, L.P., Atlanta, GA (US)

(72) Inventors: Walter Cooper Chastain, Atlanta, GA (US); Reuben Klein, East Brunswick, NJ (US); Dean Bragg, Toms River, NJ (US); John Oetting, Zionsville, PA (US); Frank Cariello, Red Bank, NJ (US); Paul Edward Smith, Jr., Rockwall, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,592

(22) Filed: Jul. 8, 2019

(65) Prior Publication Data
US 2019/0334776 A1    Oct. 31, 2019

Related U.S. Application Data

(63) Continuation of application No. 15/817,411, filed on Nov. 20, 2017, now Pat. No. 10,348,569, which is a (Continued)

(51) Int. Cl.
*H04L 12/24* (2006.01)
*G06F 9/455* (2018.01)
(Continued)

(52) U.S. Cl.
CPC ...... *H04L 41/0893* (2013.01); *G06F 9/45533* (2013.01); *H04L 45/302* (2013.01); *H04L 45/42* (2013.01)

(58) Field of Classification Search
None
See application file for complete search history.

(56) References Cited

U.S. PATENT DOCUMENTS 7,203,290 B2    4/2007    Hurst
7,769,158 B2    8/2010    Nguyen
(Continued)

FOREIGN PATENT DOCUMENTS

WO    WO 2013041261    3/2013

OTHER PUBLICATIONS

Showkat et al., "Web-of-Objects Based User-Centric Semantic Service Composition Methodology in the Internet of Things," International Journal of Distributed Sensor Networks, May 8, 2014, vol. 2014, Article ID.
(Continued)

*Primary Examiner* — Umut Onat
(74) *Attorney, Agent, or Firm* — Hartman & Citrin LLC

(57) ABSTRACT

Concepts and technologies are disclosed herein for creating and using service control functions. The service control functions can detect a message via an adapter function. The message can relate to a service controlled by the service control functions. Service policies can be accessed. The service policies can include message handling policies and can be accessed to determine if a policy relating to the message exists. If a determination is made that the policy exists, the message and the policy can be analyzed to determine an action to take with respect to the message, and the action can be initiated.

20 Claims, 11 Drawing Sheets

Related U.S. Application Data continuation of application No. 14/529,465, filed on Oct. 31, 2014, now Pat. No. 9,825,813.

(51) Int. Cl.
　　*H04L 12/725*　　(2013.01)
　　*H04L 12/717*　　(2013.01)

(56) References Cited

U.S. PATENT DOCUMENTS

| | | | |
|---|---|---|---|
| 7,970,930 B2 | 6/2011 | Dobbins et al. | |
| 8,406,402 B2 | 3/2013 | Malone et al. | |
| 8,510,551 B1 | 8/2013 | Desai | |
| 8,738,038 B2 | 5/2014 | Zhao et al. | |
| 8,842,673 B2* | 9/2014 | Akiyoshi | H04L 45/42 370/392 |
| 8,855,006 B2* | 10/2014 | Gloss | H04L 45/38 370/253 |
| 9,825,813 B2* | 11/2017 | Chastain | H04L 41/0893 |
| 9,906,461 B2* | 2/2018 | Kludy | H04L 41/0893 |
| 10,055,240 B2* | 8/2018 | Chastain | G06F 9/45537 |
| 10,348,569 B2* | 7/2019 | Chastain | H04L 41/0893 |
| 2001/0027100 A1 | 10/2001 | Immonen et al. | |
| 2004/0143631 A1 | 7/2004 | Banerjee | |
| 2004/0250243 A1 | 12/2004 | Banerjee | |
| 2006/0161466 A1 | 7/2006 | Trinon | |
| 2006/0179440 A1 | 8/2006 | Besbris | |
| 2007/0118874 A1 | 5/2007 | Adams | |
| 2008/0034049 A1 | 2/2008 | Stokes | |
| 2008/0294776 A1 | 11/2008 | Ding | |
| 2012/0192185 A1 | 7/2012 | Ashok | |
| 2013/0132058 A1 | 5/2013 | Butler | |
| 2014/0120865 A1 | 5/2014 | May | |
| 2014/0237550 A1 | 8/2014 | Anderson | |
| 2015/0106810 A1 | 4/2015 | Ciano | |
| 2015/0269511 A1 | 9/2015 | Busayarat | |

OTHER PUBLICATIONS

U.S. Office Action dated Mar. 29, 2016 in U.S. Appl. No. 14/529,465.
U.S. Office Action dated Oct. 3, 2016 in U.S. Appl. No. 14/529,465.
U.S. Office Action dated Jan. 18, 2017 in U.S. Appl. No. 14/529,465.
U.S. Notice of Allowance dated Jul. 6, 2017 in U.S. Appl. No. 14/529,465.
U.S. Office Action dated Mar. 9, 2018 in U.S. Appl. No. 15/817,411.
U.S. Office Action dated Oct. 1, 2018 in U.S. Appl. No. 15/817,411.
U.S. Notice of Allowance dated Feb. 28, 2019 in U.S. Appl. No. 15/817,411.

* cited by examiner

CREATING AND USING SERVICE CONTROL FUNCTIONS

CROSS-REFERENCE TO RELATED APPLICATIONS

This application is a continuation of and claims priority to U.S. patent application Ser. No. 15/817,411, entitled "Creating and Using Service Control Functions," filed Nov. 20, 2017, now U.S. Pat. No. 10,348,569, which is incorporated herein by reference in its entirety; and which is a continuation of and claims priority to U.S. patent application Ser. No. 14/529,465, entitled "Creating and Using Service Control Functions," filed Oct. 31, 2014, now U.S. Pat. No. 9,825,813, which is incorporated herein by reference in its entirety.

BACKGROUND

Service creation, maintenance, and delivery have evolved over the past several years. One area that has changed services is the advent of virtualization. For example, the European Telecommunications Standards Institute ("ETSI") network functions virtualization ("NFV"), software defined networking ("SDN"), and other "cloud" computing architectures and technologies have resulted in a change to the traditional hardware-software model or paradigm. For example, services can be created and deployed on commercial-off-the-shelf ("COTS") hardware, which can allow flexibility in terms of scaling, locating, and/or using the services. Building services that were designed for deployment on dedicated infrastructure and instead deploying these same services in a virtualized infrastructure may not provide the benefits of using a virtualized network. Similarly, accommodating message routing between service components used to provide a virtualized service may require increased complexity of the virtualized service relative to services built on a dedicated infrastructure. Thus, while virtualization may provide flexibility to network operators and other entities, several challenges pose difficulties in migrating services to virtualized networks.

SUMMARY

The present disclosure is directed to creating and using service control functions. A service control function can include and/or can interact with various elements. The elements can include, but are not limited to, one or more service controller, one or more message handler, one or more adapter function, one or more service inventory, one or more service recipes, one or more service policies, one or more service analytics elements ("service analytics"), combinations thereof, or the like. The service control function also can communicate and/or interact with a common data collection, analytics, and event handling ("DCAE") process or element. In some embodiments, the service control function also can support communications with a higher level service control function and/or a lower service control function arranged in a hierarchical service control arrangement. The service control functions can exist with the service scope and can manage components of the service such as, for example, VSFs, EMFs, VSFMFs, combinations thereof, or the like. The service control functions can manage orchestration, scaling, and life cycle of the services and/or service functions. The service control functions also can manage error, event, or message handling; obtaining information from services and/or components thereof, or the like.

The service controller can operate as the "brain" of the service control and/or the service control function. The service controller can monitor the service to ensure performance, to detect errors, or the like. The service controller also can manage inventory such as the service inventory, support updating of the inventories (the service inventory and/or a general inventory), and/or reconcile the inventories. The adapter functions can be configured to support or enable communications between the service control function and other elements of the control system or the service control such as, for example, the VSFs, the EMFs, the VSFMFs, or the like. The adapter functions also can support communications between the service control function and lower level service control functions and/or the service control function and higher level service control functions. The adapter function can adapt protocols of messages received at the service control function into a format or protocol that can be understood and/or acted on by the service control function.

The message handler can be configured to receive events or messages and to determine where the message is to be routed based upon message handling policies and/or the message contents. The message handling policies can be included in the service policies, in some embodiments, though this is not necessarily the case. The message handler can be configured to receive a message, to analyze the message, and to identify routing for the message based upon the analysis. In some embodiments, the message handler can route the messages to the service controller, the service analytics, other entities, or the like. In some embodiments, the message handler can route messages to multiple entities. For example, the message handler can route messages to the service controller for various actions and also can route the message (or a copy of the message) to the service analytics for analysis and/or further actions.

The service policies can include policies used by the service control function and/or the service control as illustrated and described herein. The service policies can include, but are not limited to, service management policies that can be used by the service controller to make decisions on service-related messages (e.g., scaling, termination, instantiation, etc.), message handling policies that can be used by the message handler and/or other elements (e.g., the service analytics) to route messages and/or to direct messages to various entities, and/or service analytics policies that can be used to perform analysis.

The service recipes can include recipes for creating services and/or components of the services such as the service control functions. The service recipes can reflect the components of the services and/or how the components are to be configured and/or instantiated according to various embodiments. The service recipes also can identify infrastructure that will be used to support services and/or service components such as the service control functions or the like. In some embodiments, the service control functions can be created based upon the service recipes and/or deployed to infrastructure identified by the service recipes.

The service analytics can be configured to analyze messages and/or events to monitor performance of services and/or to trigger responses to performance issues. For example, the service analytics can be configured to analyze a message and determine, based upon the message and/or service policies, that a threshold has been reached (e.g., compute threshold, bandwidth threshold, or the like). Based upon this determination, the service analytics can determine what action should be taken (e.g., suspend the threshold, move the threshold, scale the service and/or components thereof, combinations thereof, or the like).

According to one aspect of the concepts and technologies disclosed herein, a method is disclosed. The method can include receiving, at a control system including a processor, a message via an adapter function. The message can relate to a service controlled by a service control function. The method also can include accessing, by the control system, message handling policies to determine if a message handling policy relating to the message exists. If a determination is made that the message handling policy exists, the method can include analyzing, by the control system, the message and the message handling policy to determine routing for the message, and routing, by the control system, the message in accordance with the routing determined. If a determination is made that the message handling policy does not exist, the method can include routing, by the control system, the message to an alternative destination.

In some embodiments, the adapter function can translate the message from a first format to a second format. The second format can include a format used by the service control function. In some embodiments, the alternative destination can include a higher level service control function. In some embodiments, the alternative destination can include an operations management function. In some embodiments, the message can be received from a peer domain scope controller associated with a domain scope selected from the group including an infrastructure scope and a network scope.

In some embodiments, the message can be received from a component of a service, and the service can include a virtual service function and a virtual service function management function. In some embodiments, the message can be received from a master operations management function. In some embodiments, the method also can include accessing, by the control system, service policies that define handling of the message, determining, by the control system, an action to take with respect to the message based upon contents of the message and the service policies, and initiating, by the control system, the action based upon the determining. In some embodiments, the action can include forwarding a copy of the message to a service data collection, analytics, and event handling process provided by a message handler and a service analytics element.

In some embodiments, the service policies can include the message handling policies, service analytics policies, and service management policies. In some embodiments, the service control function can be created by a master operations management function. Creating the service control function can include detecting a service creation request, determining, based upon the service creation request, that the service control function does not exist and is to be created, obtaining a service control function recipe, requesting, from an infrastructure control element, instantiation of resources to host the service control function, and deploying an image of the service control function to the resources.

According to another aspect of the concepts and technologies disclosed herein, a system is disclosed. The system can include a processor and a memory. The memory can store computer-executable instructions that, when executed by the processor, cause the processor to perform operations. The operations can include receiving a message via an adapter function, the message relating to a service controlled by a service control function; accessing service policies including message handling policies to determine if a policy relating to the message exists; and in response to a determination that the policy exists, analyzing the message and the policy to determine an action to take with respect to the message, and initiating the action determined.

In some embodiments, the policy can include a message handling policy, the action can include routing the message, and initiating the action can include forwarding the message along a route determined. In some embodiments, the policy can include a service analytics policy, the action can include conducting analysis relating to the message using a service analytics element, and initiating the action can include forwarding the message to the service analytics element. In some embodiments, the action can include routing the message to a service analytics element and routing the message to a service controller. In some embodiments, the service control function can be created by detecting a service creation request; determining, based upon the service creation request, that the service control function does not exist and can be created; obtaining a service control function recipe; requesting, from an infrastructure control element, instantiation of resources to host the service control function; and deploying an image of the service control function to the resources.

According to yet another aspect, a computer storage medium is disclosed. The computer storage medium can have stored thereon computer-executable instructions that, when executed by a processor, cause the processor to perform operations. The operations can include receiving a message via an adapter function, the message relating to a service controlled by a service control function; accessing service policies including message handling policies to determine if a policy relating to the message exists; and in response to a determination that the policy exists, analyzing the message and the policy to determine an action to take with respect to the message, and initiating the action determined.

In some embodiments, the policy can include a message handling policy, the action can include routing the message, and initiating the action can include forwarding the message along a route determined. In some embodiments, the policy can include a service analytics policy, the action can include conducting analysis relating to the message using a service analytics element, and initiating the action can include forwarding the message to the service analytics element. In some embodiments, the service control function can be created by detecting a service creation request; determining, based upon the service creation request, that the service control function does not exist and is to be created; obtaining a service control function recipe; requesting, from an infrastructure control element, instantiation of resources to host the service control function; and deploying an image of the service control function to the resources.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
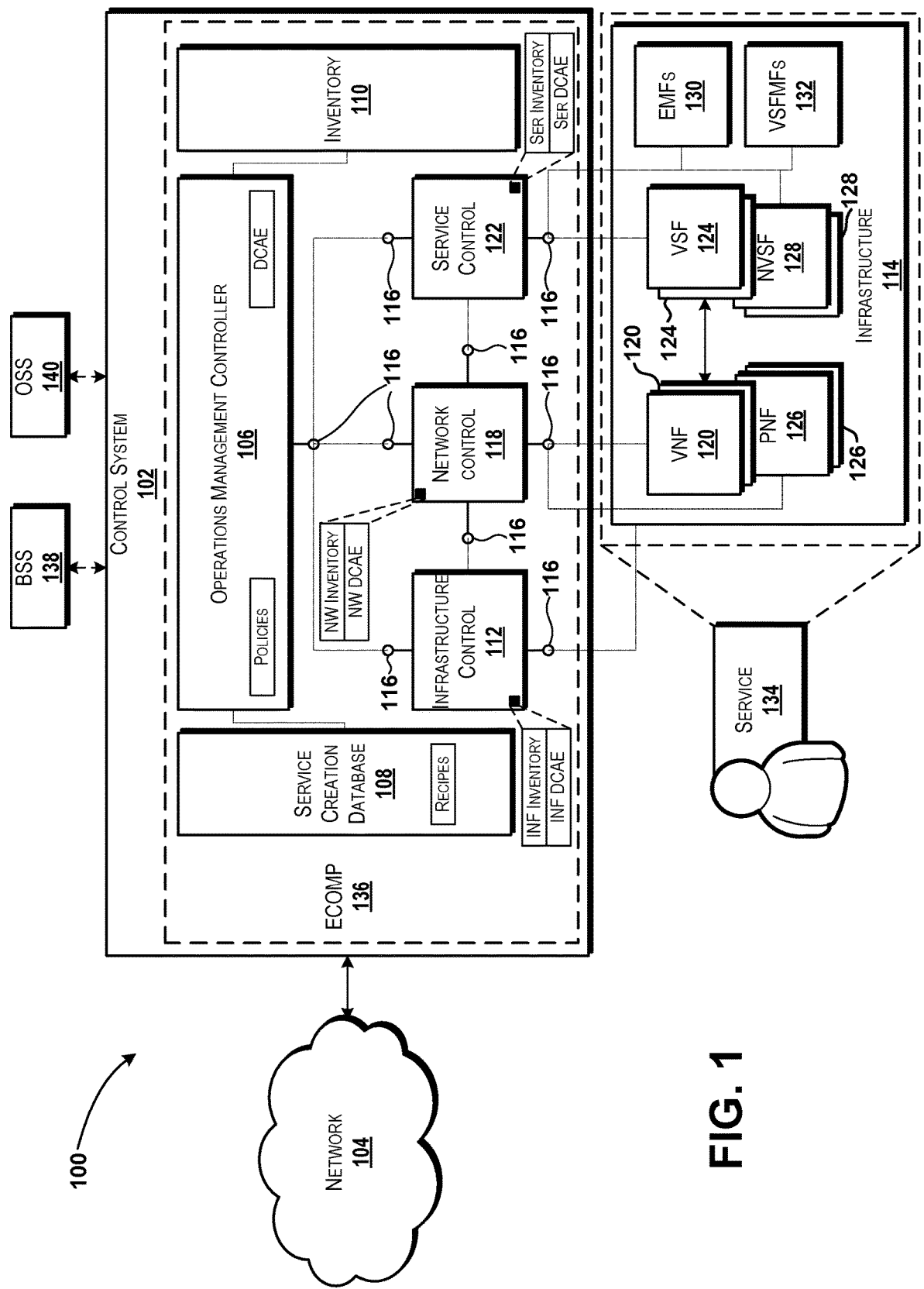
FIG. 1 is a system diagram illustrating an illustrative operating environment for various embodiments of the concepts and technologies described herein.

The following detailed description is directed to creating and using service control functions. A service control function can include and/or can interact with various elements. The elements can include, but are not limited to, one or more service controller, one or more message handler, one or more adapter function, one or more service inventory, one or more service recipes, one or more service policies, one or service analytics elements ("service analytics"), combinations thereof, or the like. The service control function also can communicate and/or interact with a common DCAE. In some embodiments, the service control function can support communications with a higher level service control function and/or a lower service control function arranged in a hierarchical service control arrangement. The service control functions can exist with the service scope and can manage components of the service such as, for example, VSFs, EMFs, VSFMFs, combinations thereof, or the like. The service control functions can manage orchestration, scaling, and life cycle of the services and/or service functions. The service control functions, also can manage error, event, or message handling; obtaining information from services and/or components thereof, or the like.

The service controller can operate as the "brain" of the service control and/or the service control function. The service controller can monitor the service to ensure performance, to detect errors, or the like. The service controller also can manage inventory such as the service inventory, support updating of the inventories (the service inventory and/or a general inventory), and/or reconcile the inventories. The adapter functions can be configured to support or enable communications between the service control function and other elements, services, or functions such as, for example, the VSFs, the EMFs, the VSFMFs, other scope domain controllers, elements of the control system, combinations thereof, or the like. The adapter functions also can support communications between the service control function and lower level service control functions and/or the service control function and higher level service control functions. The adapter function can adapt protocols of messages received at the service control function into a format or protocol that can be understood and/or acted on by the service control function.

The message handler can be configured to receive events or messages and to determine where the message is to be routed based upon message handling policies and/or the message contents. The message handling policies can be included in the service policies, in some embodiments, though this is not necessarily the case. The message handler can be configured to receive a message, to analyze the message, and to identify routing for the message based upon the analysis. In some embodiments, the message handler can route the messages to the service controller, the service analytics, other entities, or the like. In some embodiments, the message handler can route messages to multiple entities. For example, the message handler can route messages to the service controller for various actions and also can route the message (or a copy of the message) to the service analytics for analysis and/or further actions.

The service policies can include policies used by the service control function and/or the service control as illustrated and described herein. The service policies can include, but are not limited to, service management policies that can be used by the service controller to make decisions on service-related messages (e.g., scaling, termination, instantiation, etc.), message handling policies that can be used by the message handler and/or other elements (e.g., the service analytics) to route messages and/or to direct messages to various entities, and/or service analytics policies that can be used to perform analysis. The service recipes can include recipes for creating services and/or components of the services such as the service control functions.

The service recipes can reflect the components of the services and/or how the components are to be configured and/or instantiated according to various embodiments. The service recipes also can identify infrastructure that will be used to support services and/or service components such as the service control functions or the like. In some embodiments, the service control functions can be created based upon the service recipes and/or deployed to infrastructure identified by the service recipes.

The service analytics can be configured to analyze messages and/or events to monitor performance of services and/or to trigger responses to performance issues. For example, the service analytics can be configured to analyze a message and determine, based upon the message and/or service policies, that a threshold has been reached (e.g., compute threshold, bandwidth threshold, or the like). Based upon this determination, the service analytics can determine what action should be taken (e.g., suspend the threshold, move the threshold, scale the service and/or components thereof, combinations thereof, or the like).

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for creating services using service modules will be described, according to an illustrative embodiment. The operating environment 100 shown in FIG. 1 includes a computing system that can host a network control framework (hereinafter referred to as a "control system") 102. The control system 102 can operate on, in communication with, and/or as a part of a communications network ("network") 104. Additional aspects of the network 104 are illustrated and described below with reference to FIG. 6. Briefly, it should be understood that the network 104 can include almost any type of computer network as well as communications networks.

According to various embodiments, the functionality of the control system 102 may be provided by one or more server computers, workstations, desktop computers, laptop computers, other computing systems, combinations thereof, or the like. In some embodiments, the functionality of the control system 102 can be provided by a distributed computing system that can host processing and/or storage resources that collectively can be configured to provide the functionality illustrated and described herein. Thus, it should be understood that the functionality of the control system 102 can be provided by a single device, by two similar devices, and/or by two or more dissimilar devices. For purposes of describing the concepts and technologies disclosed herein, the control system 102 is described herein as including a server computer. It should be understood that this embodiment is illustrative, and should not be construed as being limiting in any way.

The device that hosts the control system 102 can execute an operating system (not shown in FIG. 1) and one or more application programs that can provide the functionality of the control system 102 illustrated and described herein. The operating system can include a computer program for controlling the operation of the device, and the application programs can include executable programs configured to execute on top of the operating system to provide various functions as illustrated and described herein. Thus, while the control system 102 is illustrated and described as including multiple elements, it should be understood that the functionality of the elements shown in FIG. 1 can be provided by application modules executed by a single device, in some embodiments. In some other embodiments, the functionality of the elements shown in FIG. 1 can be provided by multiple devices that can host one or more elements of the control system 102. As such, the illustrated and described embodiment should be understood as being illustrative of one contemplated embodiment of the concepts and technologies described herein and should not be construed as being limiting in any way.

As shown in FIG. 1, the control system 102 can include an operations management controller 106. The operations management controller 106 can be configured to provide control and management of the control system 102 and/or the various elements thereof. According to various embodiments, the operations management controller 106 can provide high level and end-to-end control of services, creation of services, and/or management of services. The operations management controller 106 can manage services across multiple scopes (e.g., through infrastructure, network, and service scopes), and can control and orchestrate service creation and management as illustrated and described herein.

The operations management controller 106 can serve as a master service orchestrator ("MSO") for the control system 102. The operations management controller 106 can instantiate new services based upon "recipes" that can be stored in a service creation database 108 or elsewhere as illustrated and described herein. The operations management controller 106 also can use information stored in the inventory 110 when creating new services. The operations management controller 106 also can instantiate scope control domain entities (e.g., controllers for infrastructure, network resources, and/or service functions), as will be explained in more detail below.

The operations management controller 106 can handle messages and/or exceptions that can be generated by the operations management controller 106 and/or exceptions that may be passed to the operations management controller 106 from the scope control domain (e.g., the controllers for the infrastructure, network resources, and/or the service functions) as will be illustrated and described below in more detail. The operations management controller 106 also can run a high level data collection, analytics, and event handling ("DCAE") process to analyze data relating to services and/or the various components for managing the services and/or its associated infrastructure, network, and service components. The operations management controller 106 also can run a policy decision function using a high level set of policies for service creation and/or control.

As mentioned above, the service creation database 108 can define products and services using definitions of components of services such as hardware, software, and/or transport that can be referred to herein as "recipes" or "service recipes." The recipes can specify one or more components of a service and a process or operations for putting the components together. Thus, the recipes may involve a service scope (e.g., a set of service functions), a network scope (e.g., a set of network functions and/or information indicating how network transport is to be established, maintained, and/or used), and an infrastructure scope (e.g., where on the network 104 the network and service functions are to be located). The recipes also can implicitly or explicitly specify whether the various components of the service should be tightly coupled together and/or loosely coupled together, as will be explained in more detail below. It should be understood that the term "service" also can include an "application," and that the term "service" is not used to limit the concepts and technologies described herein in any way. The service creation database 108 can be used by a service provider, by third parties, and/or by customers.

The inventory 110 can maintain or reflect up-to-date information about resource utilization. The information can include a total number of resources, an amount of available resources, an amount of resources in use, or the like. It should be understood that the "resources" can include infrastructure resources, network resources, and/or service resources. Thus, the inventory 110 can be used to understand what resources (in terms of infrastructure, network, and/or service) exist, what resources are in use, and/or what resources are free or available.

According to various embodiments, the inventory 110 can reside entirely within a control domain (e.g., within a service domain, network domain, or infrastructure domain) or outside of the domains, e.g., in an inventory and/or data structure that is hosted outside of the controllers illustrated and described herein. Thus, in some embodiments the inventory 110 can include data indicating or reflecting all inventory (infrastructure, network, and service) for the entire network 104 and/or the elements in communication with the network 104. Thus, the inventory 110 can provide end-to-end active view capability for active and/or inactive resources across all scopes of the control system 102.

In some other embodiments, the inventory 110 may be divided across the scope controllers so that each controller can have a local inventory that relates to that controller's scope. A controller for the infrastructure domain, for example, can maintain an infrastructure inventory. Similarly, controllers for network and service scopes can maintain scope-specific inventories. An inventory for the scope domain is illustrated and described with reference to FIG. 2 below. Even if scope-specific inventories are provided, the inventory 110 still can provide end-to-end viewing capability for the divided inventory embodiment, if desired. It should be understood that this example is illustrative and therefore should not be construed as being limiting in any way.

According to various embodiments, the operations management controller 106 can communicate with one or more infrastructure control elements or controllers (collectively referred to herein as "infrastructure control") 112. The infrastructure control 112 can manage assets of network infrastructure ("infrastructure") 114. Thus, the infrastructure control 112 can interact with the infrastructure 114 to instantiate virtual resources such as virtual machines and/or virtual storage devices and/or to allocate hardware resources that will host various service and/or network functions as illustrated and described herein. According to various embodiments, however, the infrastructure control 112 may not manage networking functions and/or service functions, as will be explained in more detail below.

The infrastructure control 112 can include and/or can execute a policy engine using an infrastructure set of policies. The infrastructure control 112 also can handle infrastructure scope exceptions, in some embodiments. The infrastructure control 112 can include functionality for managing and orchestrating the infrastructure 114; infrastructure EMFs, which may manage various fault, configuration, accounting, performance, and security ("FCAPS") capabilities; an infrastructure data, collection, analytics, and events ("DCAE") process (labeled as "INF DCAE" in FIG. 1) that can provide information to the controller and/or to the operations management controller 106; a policy decision function with infrastructure scope policies; and/or an infrastructure inventory function (labeled "INF Inventory" in FIG. 1) that can represent infrastructure-scoped inventory and usage information or provide this information to the inventory 110. It should be understood that this example is illustrative and therefore should not be construed as being limiting in any way.

The infrastructure control 112 can receive instructions and/or requests from the operations management controller 106 or other entities via an operations management application programming interface ("API") 116. As shown in FIG. 1, there can be multiple APIs 116 that can be called or accessed by various elements of the control system 102 to support the functionality illustrated and described herein. Although the APIs 116 are given the same reference numeral in the drawings, it should be understood that one or more (or each) of the APIs 116 can use different technologies (e.g., formats and/or semantics) to support calls to the various elements and/or to support the communications illustrated and described herein. According to some embodiments, the API 116 between the infrastructure control 112 and the operations management controller 106 can correspond to an operations management ("OM") API 116, though this is not necessarily the case.

Similarly, the infrastructure control 112 can communicate with a network control device or controller (hereinafter collectively referred to as the "network control") 118 via a software defined networking ("SDN") API 116. Thus, it can be appreciated that the infrastructure control 112 and the network control 118 can support SDN and virtualization technologies simultaneously. As will be explained in more detail below, the network control 118 can be configured to create and manage virtual networking functions ("VNFs") 120 within the infrastructure 114. In some instances, the infrastructure control 112 also can load VM images with embedded VNFs 120 (e.g., a virtual switch) in addition to, or instead of, the network control 118. The functionality of the network control 118 will be described in more detail below.

The infrastructure control 112 also can communicate with the infrastructure 114 via an API 116. Thus, the infrastructure control 112 can interact with the infrastructure 114 to instantiate resources and/or allocate hardware to support various functions as illustrated and described herein. In addition to supporting the VNFs 120, the infrastructure 114 also can interact with a service control device or controller (hereinafter collectively referred to as the "service control") 122 to receive instructions for instantiating one or more virtual service functions ("VSFs") 124 within the infrastructure 114. A VSF 124 can include a virtualized application or application component, and can be used to create other services of various types including, but not limited to, basic services, segmented services, and/or composite services as will be illustrated and described in more detail herein. The functionality of the service control 122 and creation of various types of services using the service control 122 will be described in more detail below.

The operations management controller 106 also can communicate with the network control 118. The network control 118 can be responsible for management, deployment, operation, and coordination of a transport network for a particular service. According to various embodiments, the transport network between one or more components of a service (e.g., "service modules") can be created by creating a group of one or more VNFs 120 within the infrastructure 114. The transport network also can include physical network functions ("PNFs") 126, which can be selected from an available inventory of physical resources, configured, and/or controlled by the network control 118.

The transport network can include various VNFs 120, PNFs 126, and/or other networking functions. The PNFs 126 can include, for example, European Telecommunications Standards Institute PNFs ("ETSI PNFs"). In some embodiments, the transport network may include other types of networking functions such as leaf switches, spine switches, or the like, while in some other embodiments, leaf switches and/or spine switches may be considered part of the infrastructure 114. The VNFs 120 can include virtualized network functions that can exist in the network scope. Thus, according to various embodiments, the VNFs 120 can include virtual switches ("vSwitches"), virtualized routing functions and/or virtual routers, a virtual tap, or the like. Because the transport network can include other types of functions, it should be understood that these examples are illustrative and therefore should not be construed as being limiting in any way.

The network control 118 also can establish and manage software defined networks, maintain a network scope resource inventory, run a network scope data collection and analysis process, run a policy engine using a network scope set of policies, and handle network scope exceptions. The network control 118 can include a software defined network controller; one or more virtual network function management functions; one or more network element management functions ("EMFs"), which can manage FCAPS for network scoped services; a network DCAE process (labeled as "NW DCAE" in FIG. 1), which can provide information to the network control 118 and/or the operations management controller 106; a network policy engine with network scope policies; and a network inventory function (labeled as "NW Inventory" in FIG. 1), which can provide network scoped inventory and usage information to the inventory 110.

According to various embodiments, the network control 118 can receive requests from the operations management controller 106 via an API 116 such as the OM API 116 discussed above. The requests from the operations management controller 106 received via the OM API 116 can instruct the network control 118 to create, modify, and/or terminate one or more networking functions such as VNFs 120, PNFs 126, and/or some infrastructure networking functions, if controlled or controllable by the network control 118. These infrastructure networking functions can include network hardware (e.g., switches, leaf switches and spine switches, or the like) and other infrastructure networking functions. Some other infrastructure networking functions (e.g., wires, physical ports, switches, leaf switches and spine switches (if not controlled by network control 118), or the like), can be considered a part of the infrastructure 114. The network control 118 also can be configured to receive instructions to establish or modify transport using VNFs 120 and/or PNFs 126 in addition to, or instead of, instantiating the VNFs 120 and/or the PNFs 126. It should be understood that this example is illustrative and therefore should not be construed as being limiting in any way.

The network control 118 also can initiate requests to the infrastructure control 112 via the OM API 116 to request and/or obtain additional network resources. For example, the network control 118 can request the infrastructure control 112 to allocate one or more virtual machines ("VMs") and load an image with an embedded VNF 120 to the VM. The network control 118 also can receive requests via an SDN API 116 from infrastructure control 112 to create, modify, and/or terminate transport. Thus, it can be appreciated that the network control 118 can support SDN and virtualization technologies simultaneously. It should be understood that this example is illustrative and therefore should not be construed as being limiting in any way.

The operations management controller 106 also can communicate with the service control 122. The service control 122 can be responsible for management, deployment, operation, and coordination of services. Services can be provided by and/or can include one or more VSFs 124, non-virtualized service functions ("NVSFs") 128, one or more EMFs 130, one or more VSF management functions (labeled "VSFMFs" in FIG. 1) 132, combinations thereof, or the like.

According to various embodiments, the services and/or service components ("service modules") can be created by the service control 122 by creating a group of one or more VSFs 124 and/or NVSFs 128 within the infrastructure 114. Thus, it should be understood that the NVSFs 128 can be created and/or controlled by the service control 122. The service control 122 can create three or more types of services including, but not limited to, basic services, segmented services, and/or composite services. It also should be understood that the operations management controller 106 can create the VSFs 124 and initiate requests to the infrastructure 114 and network control 118. As such, it should be understood that the operations management controller 106 and/or the service control 122 can create a service, depending upon a degree of delegation awarded to the service control 122 by the operations management controller 106 when the operations management controller 106 created the service control 122.

According to various embodiments, the service control 122 also can maintain a service scope resource inventory (labeled "Ser Inventory" in FIG. 1). The service scope resource inventory can be maintained at the service control 122, in some embodiments, and can provide service scope resource inventory and usage information to the inventory 110. The service control 122 can also run a service scope DCAE (labeled as "Ser DCAE" in FIG. 1) to analyze messages and/or events occurring within or relating to services, service components, and/or service functions such as the VSFs 124 and the NVSFs 128.

The service control 122 also can run a policy engine for a service scope set of policies. Thus, service-specific policies can be applied and/or used by the service control 122 when creating services, service components, and/or service functions such as the VSFs 124 and/or the NVSFs 128. The service control 122 also can handle service scope exceptions, in some embodiments. As noted above, the operations management controller 106 also can create services, service components, and/or service functions depending upon the degree to which the operations management controller 106 delegates control to the service control 122. It should be understood that these example components of the service control 122 are illustrative and therefore should not be construed as being limiting in any way.

The service control 122 can be responsible for management and control of services and/or the components or functions of the services. According to various embodiments, the service control 122 can manage VSFs 124 and/or NVSFs 128 of services being controlled. The service control 122 also can handle service EMFs, which can manage FCAPS for services being controlled. The service DCAE process can provide information to the service control 122 and/or the operations management controller 106. The service control 122 also can include a service policy engine, which can apply and/or enforce service scope policies. The service inventory can provide service scope inventory and/or usage information to the inventory 110.

According to various embodiments, the service control 122 can receive requests from the operations management controller 106 via an API 116 such as the OM API 116 discussed above. The requests from the operations management controller 106 received via the OM API 116 can instruct the service control 122 to create, modify, and/or terminate one or more service functions such as VSFs 124, the NVSFs 128, and the like. It should be understood that this example is illustrative and therefore should not be construed as being limiting in any way.

The service control 122 also can initiate requests to the infrastructure control 112 via the OM API 116 to request and/or obtain additional infrastructure resources and/or other resources. The service control 122 also can initiate requests via an SDN API 116 to the network control 118. Thus, it can be appreciated that the service control 122 can support SDN and virtualization technologies simultaneously. These requests can be configured to request creation, modification, and/or termination of service related transport (e.g., transport between service functions and/or service control functions). It should be understood that this example is illustrative and therefore should not be construed as being limiting in any way.

The APIs 116 illustrated and described herein can include two or more types of APIs 116. In some embodiments, as mentioned above, the APIs 116 can include an OM API 116 and/or SDN APIs 116. The APIs 116 can be exposed by some or all of the components within the control system 102. The APIs 116 can be exposed by the components to each other, for various purposes. For example, the APIs 116 can include an operations management API 116, which can be exposed by the operations management controller 106; infrastructure APIs 116, which can be exposed by the infrastructure control 112; network APIs 116, which can be exposed by the network control 118; and service APIs 116, which can be exposed by the service control 122. Thus, it can be appreciated that the control system 102 and the components thereof can support SDN and virtualization technologies simultaneously.

The APIs 116 can be used to enable operational management within the control system 102 and between the control system 102 and the infrastructure 114. The APIs 116 can be exposed in either direction. As such, the APIs 116 can be exposed in a southbound direction, e.g., from the operations management controller 106 to the infrastructure control 112, the network control 118, or the service control 122; from the infrastructure control 112 to the infrastructure 114; from the network control 118 to the VNFs 120 loaded to the infrastructure 114; and/or from the service control 122 to the VSFs 124 loaded to the infrastructure 114. The APIs 116 also can enable communications in a northbound direction, e.g., the APIs 116 can enable the VNFs 120 to access the network control 118; the VSFs 124 to access or communicate with the service control 122; and the infrastructure 114 to access the infrastructure control 112. Similarly, the APIs 116 can be accessed by the infrastructure control 112, the network control 118, and/or the service control 122 to enable access to the operations management controller 106. It should be understood that this example is illustrative and therefore should not be construed as being limiting in any way.

The SDN APIs 116 can be exposed by the network control 118 to the operations management controller 106, the infrastructure control 112, and the service control 122. The SDN APIs 116 can enable the operations management controller 106, the infrastructure control 112, and the service control 122 to make requests to the network control 118 for SDN services. It should be understood that this example is illustrative and therefore should not be construed as being limiting in any way.

By creating, allocating, and/or instantiating the VNFs 120, the PNFs 126, the VSFs 124 the NVSFs 128, the EMFs 130, the VSF management functions 132, and/or combinations thereof, the control system 102 can create a service 134 on the infrastructure 114. It should be understood that this example is illustrative and therefore should not be construed as being limiting in any way.

According to various embodiments, the control system 102 can integrate an enhanced control, orchestration, management, and policy framework (hereinafter referred to as "ECOMP") 136, which can be integrated into the control system 102. The ECOMP 136 can enable rapid service creation by combining pre-built components and/or functions. The ECOMP 136 also can enable dynamically elastic capacity management by enabling scaling and instantiation. The ECOMP 136 also can support control functions. The control functions can be driven by real-time analytics and policy decisions. The ECOMP 136 also can support unified operations, administration, and management across the three scopes (e.g., infrastructure, network, and service). The ECOMP 136 also can support optimization of services 134 and/or the components, as well as analytics of the services 134, components thereof, and/or the various components of the control system 102. As illustrated and described in the FIGURES, the ECOMP 136 can be an element of the control system 102, in some embodiments, while in other embodiments the control system 102 can correspond to an embodiment of the ECOMP 136. It should be understood that these examples are illustrative and therefore should not be construed as being limiting in any way.

The ECOMP 136 can include a service design and creation ("SDC") environment, an active and available inventory ("AAI"), an operations management framework ("OMF"), and/or a service, infrastructure, and/or network control. Thus, the ECOMP 136 can include, in some embodiments, the service creation database 108, the inventory 110, the operations management controller 106, and/or one or more of the infrastructure control 112, the network control 118, and/or the service control 122. It should be understood that this example is illustrative and therefore should not be construed as being limiting in any way.

The SDC component of the ECOMP 136 can enable developers, service designers, network planners/engineers, operations planners and product managers, other entities, or the like, to create, organize, prototype, and deploy services 134. In some embodiments, service definitions can be instantiated by the OMF and the resulting service instances can be recorded in the AAI. According to various embodiments, components associated with a service 134 can be created in the SDC component and stored as recipes. Thus, the SDC component can store recipes for VSF components ("VSFCs", which are illustrated and described with reference to FIG. 2), VSFs 124, service components (illustrated and described with reference to FIG. 2), basic services (illustrated and described with reference to FIG. 2), segmented services (illustrated and described with reference to FIG. 2), composite services (illustrated and described with reference to FIG. 2), and various network and/or infrastructure resources. The recipes also can indicate whether or not various components of services 134 are to be tightly coupled, loosely coupled, or a combination thereof. It should be understood that this example is illustrative and therefore should not be construed as being limiting in any way.

As used in the description and the claims, the phrase "tightly couple" and/or variants thereof can be used to refer to service modules that are joined, chained, and/or used together in a manner in which the interdependency, coordination, and information flow between the service modules is high (relative to loosely coupled service modules) and as a result, the probability that one service module may affect another is high (relative to loosely coupled service modules). Thus, the phrase "loosely couple" and/or variants thereof can be used to refer to service modules that have a relatively low interdependency, coordination, and/or information flow (relative to tightly coupled service modules) and/or service modules that have a low probability of affecting one another.

According to various embodiments, it may be preferable to design services that are loosely coupled as service modules that are loosely coupled may be reusable and/or may be simpler than tightly coupled service modules. Such reusability may result in faster implementation times (for services that use the service modules) and/or more efficient use of resources. Similarly, tightly coupled service modules may be more complex than loosely coupled components and may not be reusable. In some instances, however, service modules may affect one another (even unintentionally), and the service modules therefore may be tightly coupled together through the use of a service control function to improve performance and reliability. As noted above, the recipes used to design and/or instantiate services can indicate (implicitly or explicitly) if the service modules should be tightly coupled and/or loosely coupled, in some embodiments. According to various embodiments of the concepts and technologies described herein, service modules can be termed to be "tightly coupled" if a service control function controls the service modules. It should be understood that this example is illustrative and therefore should not be construed as being limiting in any way.

The AAI can provide real-time views of services, infrastructure, and networks in aggregate. The AAI can obtain the data from the service control 122 and the network control 118, and/or can supplement views with customer and account data. The OMF can provide and extend upon FCAPS capabilities through the use of analytics, policy, orchestration, and control functions. The OMF can be a repeating pattern of control, orchestration, DCAE, and policy management functions. It should be understood that this example is illustrative and therefore should not be construed as being limiting in any way.

In some embodiments, the OMF and service, infrastructure, and network control functions can form a series of closed loop control capabilities. These capabilities can be referred to as "operational control loops." These "operational control loops" can be based on data and events collected and analyzed via the DCAE. Responsive actions can be based upon policy, and may be taken by one or more of orchestration or controller functions. "Operational control loops" can be repeating patterns that may be implemented in various locations and supporting various scopes of operation.

In some embodiments, the OMF can interact with one or more business support system ("BSS") 138 and one or more operations support system ("OSS") 140. The BSS 138 and the OSS 140 can be external to the ECOMP 136, in some embodiments. The BSS 138 and the OSS 140 can interact with customers and operations in support of activities and aggregate capabilities across UDNC and non-UDNC services.

Each instantiation of the OMF can be specifically tailored to the scope in which the OMF operates. The OMF may exist as a top-level end-to-end function that can be separate from service, infrastructure, and network control, and the platform components of the OMF may exist in various places within service and network control. It should be understood that this example is illustrative and therefore should not be construed as being limiting in any way.

As mentioned above, although the operations management controller 106, the service creation database 108, the inventory 110, the infrastructure control 112, the network control 118, the service control 122, and the ECOMP 136 are illustrated as components of the control system 102, it should be understood that each of these components, or combinations thereof, may be embodied as or in stand-alone devices or components thereof operating as part of or in communication with the network 104 and/or the control system 102. Thus, for example one or more of these components can be hosted by a server computer or other computing device that can access other devices via one or more of the APIs 116, and/or can be accessed via one or more of the APIs 116. As such, the illustrated embodiment should be understood as being illustrative of only some contemplated embodiments and should not be construed as being limiting in any way.

In practice, the operations management controller 106 can detect a request for a service 134. According to various embodiments, the operations management controller 106 can detect a request to configure or reconfigure a service 134 or a request for a new service 134. In some embodiments of creating or scaling services 134, the operations management controller 106 can analyze one or more policies to determine how the scaling or creation of the service 134 should be handled. The operations management controller 106 also can access the service creation database 108 to identify one or more "recipes" that can be used to scale or create the service 134. The recipes can define service components including hardware, software, and/or transport.

The operations management controller 106 can access the inventory 110 to determine if the resources needed to support the new or scaled service 134 are available for use. The operations management controller 106 also can identify a service control 122 that is to handle the scaled or created service 134. It can be appreciated that in some embodiments, a scaled service 134 may be controlled by a service control 122 that already is controlling the components of a service 134. The operations management controller 106 can select, allocate, and/or create the service control 122.

The operations management controller 106 also can instruct the infrastructure control 112 to instantiate one or more VMs and to load and validate VNFs 120 and/or VSFs 124 to the VMs. It should be understood that if the service is being scaled down, that the infrastructure control 112 may de-allocate VMs, VNFs 120, and/or VSFs 124 instead of instantiating the VMs, VNFs 120, and/or VSFs 124. The infrastructure control 112 can also instruct the network control 118 to create or establish transport between the VMs, the VNFs 120, the VSFs 124, and/or the service control 122. In the case of scaled down services 134, it can be appreciated that the network control may de-allocate or tear down transport. The network control 118 can report the event to the network DCAE and/or update the network inventory (and/or the inventory 110).

The service control 122 can receive instructions from the operations management controller 106 to instantiate or tear down one or more VSFs 124. The service control 122 can report the event to a service DCAE and update the service inventory (and/or the inventory 110). The network control 118 also can receive instructions to establish transport between the new VSFs 124 and report the event to the network DCAE for scaled up services 134 and/or to tear down the VSFs 124 and report those events to the network DCAE for scaled down services 134. The network control can establish transport using VNFs 120 and/or PNFs 126. The operations management controller 106 can validate the scaled or created service 134 end-to-end and/or update the inventory 110.

According to various embodiments of the concepts and technologies described herein, the service control 122 or the operations management controller 106 can be used to create (allocate, instantiate, or design) various types of services such as the service 134. According to various embodiments of the concepts and technologies described herein, the service control 122 and/or the operations management controller 106 can be used to create a service 134 by identifying one or more service modules or service components and identifying a service control function that is to control the service 134 and/or components thereof. If a service control function does not exist (and therefore cannot be allocated), the service control function can be created as illustrated and described herein. Additional aspects of the service control function will be illustrated and described herein with reference to FIG. 2.

In some embodiments, the operations management controller 106 or one or more elements of the service control 122 can be used to create (design, allocate, or instantiate) the services 134 and/or the service control functions associated with the services 134. According to some embodiments, the operations management controller 106 or other elements of the control system 102 can be configured to obtain a recipe for the service control function, analyze the service control function recipe to identify infrastructure that will support the service control function, request infrastructure control 112 to create the resources for the service control function, and deploy and/or configure the service control function (e.g., an image of the service control function) to the resources. The service control function is illustrated and described in more detail with reference to FIG. 2 below. Thus, the service control function created in accordance with the concepts and technologies described herein can include the various elements illustrated and described with reference to FIG. 2 and/or can perform the operations illustrated and described herein with reference to FIGS. 3-8. It should be understood that these examples are illustrative and therefore should not be construed as being limiting in any way.

FIG. 1 illustrates one control system 102, one network 104, one operations management controller 106, one service creation database 108, one inventory 110, one infrastructure control 112, one instance of infrastructure 114, one network control 118, one service control 122, one service, one ECOMP 136, one BSS 138, and one OSS 140. It should be understood, however, that various implementations of the operating environment 100 can include zero, one, or more than one control system 102; zero, one, or more than one network 104; zero, one, or more than one operations management controller 106; zero, one, or more than one service creation database 108; zero, one, or more than one inventory 110; zero, one, or more than one infrastructure control 112; zero, one, or more than one instance of infrastructure 114; zero, one, or more than one network control 118; zero, one, or more than one service control 122; zero, one, or more than one service; zero, one, or more than one ECOMP 136; zero, one, or more than one BSS 138, and zero, one, or more than one OSS 140. As such, the illustrated embodiment should be understood as being illustrative, and should not be construed as being limiting in any way.

Figure 2:
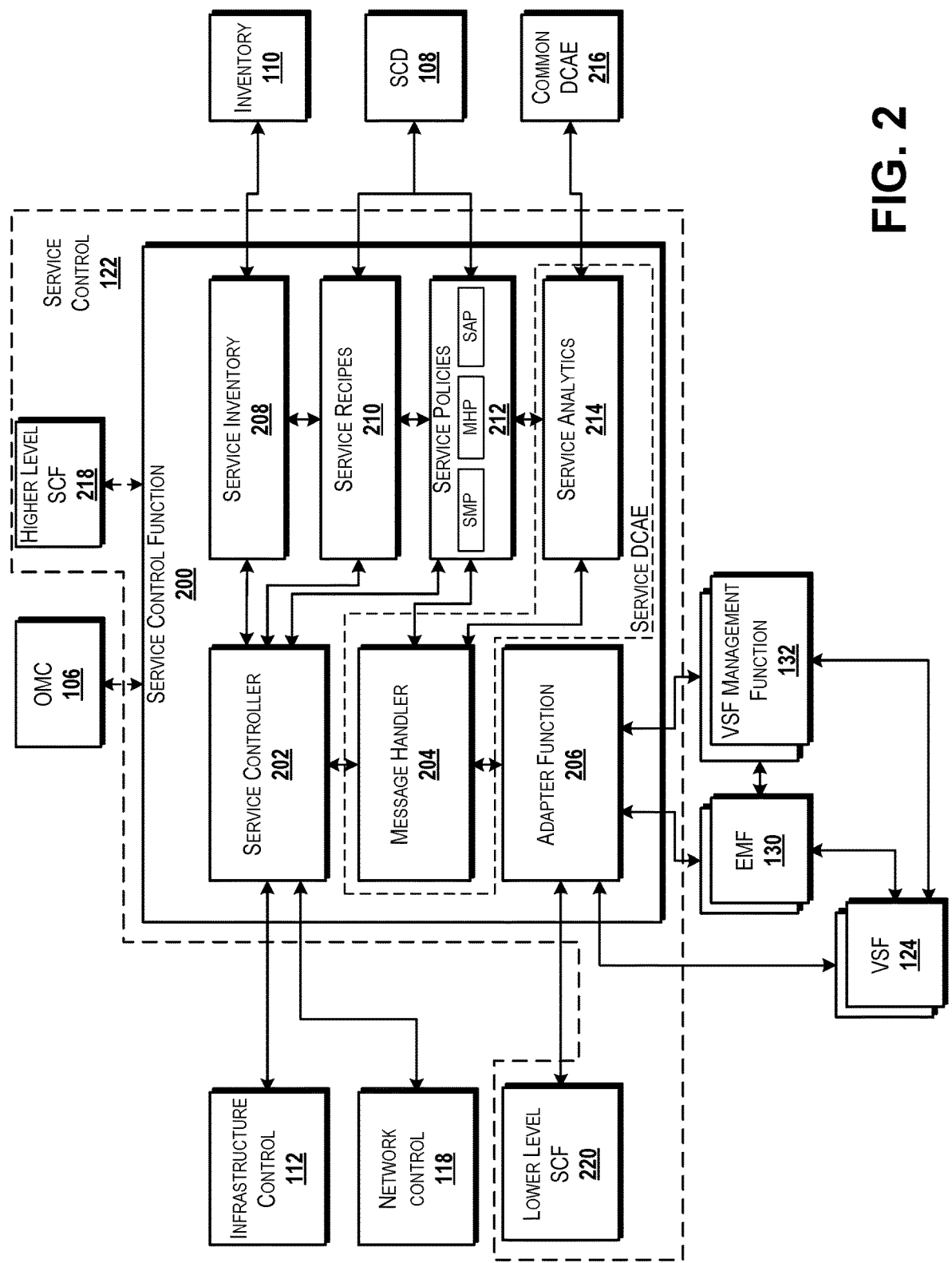
FIG. 2 is a system diagram showing some aspects of a service control, according to various embodiments of the concepts and technologies described herein.

Turning now to FIG. 2, aspects of a service control function 200 will be described in accordance with various example embodiments of the concepts and technologies described herein. As shown in FIG. 2, the service control 122 can include various elements and/or modules including, but not limited to, a service control function 200. The service control function 200 also can include and/or can interact with various elements. The elements can include, but are not limited to, one or more service controller 202, one or more message handler 204, one or more adapter function 206, one or more service inventory 208, one or more service recipes 210 (or sets thereof), one or more service policies 212 (or sets thereof), one or more service analytics elements ("service analytics") 214, combinations thereof, or the like.

The service control 122 also can communicate and/or interact with a common DCAE 216 (which can correspond to the DCAE illustrated in FIG. 1 within the operations management controller 106). In some embodiments, the service control 122 also can include and/or can support communications with a higher level service control function 218 and/or a lower service control function 220. The terms "higher" and "lower" as used herein to modify the service control function term is subjective. In particular, the service control function 200, the higher level service control function 218, and the lower level service control function 220, can be used to provide a hierarchically arranged service control structure or framework for a service 134 and/or service elements or modules. In some embodiments, the hierarchy of service control functions 200, 218, 220 can support north-to-south arrangements of service control functions 200, 218, 220. Thus, while service control functions 200 can be configured to communicate with other scope domain controllers (e.g., an infrastructure controller of the infrastructure control 112, a network controller of the network control 118, or the like), the service control functions 200 may not support communications with other peer service control functions 200.

The service control functions 200, 218, 220 can exist with the service scope and can manage components of the service 134 such as, for example, VSFs 124, EMFs 130, VSFMFs 132, combinations thereof, or the like. The service control functions 200, 218, 220 can manage orchestration, scaling, and life cycle of the services 134 and/or service functions. The service control functions 200, 218, 220 also can manage error, event, or message handling; obtaining information from services 134 and/or components thereof, or the like.

The service control functions 200, 218, 220 also can communicate with the AAI and/or the service creation database 108, in some embodiments. The service control functions 200, 218, 220 also can communicate with common DCAE 216 and/or a local service DCAE such as the service DCAE illustrated in FIGS. 1-2. It can be appreciated that the service DCAE can include the message handler 204 and the service analytics 214, in some embodiments.

The service controller 202 can operate as the "brain" of the service control 122. The service controller 202 can be a UDNC-architecture control element. The service controller 202 can monitor the service 134 and/or components thereof to ensure performance and/or to detect errors, or the like. The service controller 202 also can manage inventory such as the service inventory 208 and/or the inventory 110, support updating of the inventories 110, 208, and/or reconcile the two. Because the service controller 202 can perform additional and/or alternative functions as illustrated and described herein, it should be understood that these examples are illustrative and therefore should not be construed as being limiting in any way.

The adapter function 206 (or combination of adapter functions 206) can be configured to support or enable communications between the service control function 200 and/or other elements of the control system 102 or the service control 122. For example, the adapter function 206 can enable communication between the service control function 200 and the VSFs 124, the EMFs 130, the VSFMFs 132, or the like. The adapter function 206 also can support communications between the service control function 200 and lower level service control functions 220 and/or the service control function 200 and higher level service control functions 218. The adapter function 206 also can adapt protocols of messages received at the service control function 200 into a format or protocol that can be understood and/or acted on by the service control function 200.

The message handler 204 can be configured to receive events or messages and to determine where the message is to be routed based upon message handling policies and/or the message contents. The message handling policies can be included in the service policies 212, in some embodiments, though this is not necessarily the case. The message handler 204 can be configured to receive a message, to analyze the message, and to identify routing for the message based upon the analysis. In some embodiments, the message handler 204 can route the messages to the service controller 202, the service analytics 214, other entities, or the like, as will be illustrated and described in more detail below with reference to FIGS. 3-8.

In some embodiments, the message handler 204 can route messages to multiple entities. For example, the message handler 204 can route messages to the service controller 202 for various actions and also can route the message (or a copy of the message) to the service analytics 214 for analysis and/or further actions. It should be understood that the service analytics 214 and the message handler 204 can collectively provide the service DCAE illustrated and described above with reference to FIG. 1 and as shown in FIG. 2.

The service policies 212 can include policies used by the service control function 200 and/or the service control 122 as illustrated and described herein. The service policies 212 can include, but are not limited to, three types of policies. The service policies 212 can include service management policies (labeled "SMP" in FIG. 2) that can be used by the service controller 202 to make decisions on service-related messages (e.g., scaling, termination, instantiation, etc.). The service policies 212 also can include message handling policies (labeled "MHP" in FIG. 2) that can be used by the message handler 204 and/or other elements (e.g., the service analytics 214) to route messages and/or to direct messages to various entities. The service policies 212 also can include service analytics policies (labeled "SAP" in FIG. 2) that can be used to perform analysis by the service analytics 214. The service analytics policies can include, for example, rules or policies for receiving and analyzing messages or other data, actions that can be take in response to various states detected during the analysis, routing and/or data flows, combinations thereof, or the like. Because other policies and/or rules are contemplated and are possible, it should be understood that these examples are illustrative and therefore should not be construed as being limiting in any way.

The service recipes 210 can include recipes for creating services 134 and/or components of the services 134 such as the service control functions 200. The service recipes 210 can reflect the components of the services 134 and/or how the components are to be configured and/or instantiated according to various embodiments. The service recipes 210 also can identify infrastructure 114 that will be used to support services 134 and/or service components such as the service control functions 200 or the like. The service recipes 210 can also define or specify how the networking aspects of services are supported. For example, the service recipes 210 can specify how components of the service 134 are networked together, communicate with one another, or the like. In some embodiments, the service control functions 200 can be created based upon the service recipes 210 and/or deployed to infrastructure 114 identified by the service recipes 210.

The service analytics 214 can be configured to analyze messages and/or events to monitor performance of services 134 and/or to trigger responses to performance issues. For example, the service analytics 214 can be configured to analyze a message and determine, based upon the message and/or service policies 212, that a threshold has been reached (e.g., compute threshold, bandwidth threshold, or the like). Based upon this determination, the service analytics 214 can determine what action should be taken (e.g., suspend the threshold, move the threshold, scale the service 134 and/or components thereof, combinations thereof, or the like). It should be understood that these examples are illustrative and therefore should not be construed as being limiting in any way.

It can be appreciated with reference to FIG. 2 that the functionality illustrated and described herein for the service control 122 can be supported by the service control function 200 and/or the various components thereof as illustrated and described herein with reference to FIGS. 3-8. It also must be understood that the concepts and technologies described herein for the service control function 200 can be applied to the network control 118. Thus, a network control function can operate in a manner that is substantially identical to the service control function 200, though the network control function can control the VNFs 120 and/or other network functions instead of, or in addition to, the service functions as illustrated and described herein. As such, the examples herein of a service control function are illustrative of control functions in general and should not be construed as being limiting in any way. Although arrows are drawn between various elements in FIG. 2, it should be understood that messages and/or data can flow between the various elements whether or not arrows illustrate such flows. For example, communications between the service controller 202 and the infrastructure control 112 can occur via the adapter function 206, etc.

Figure 3:
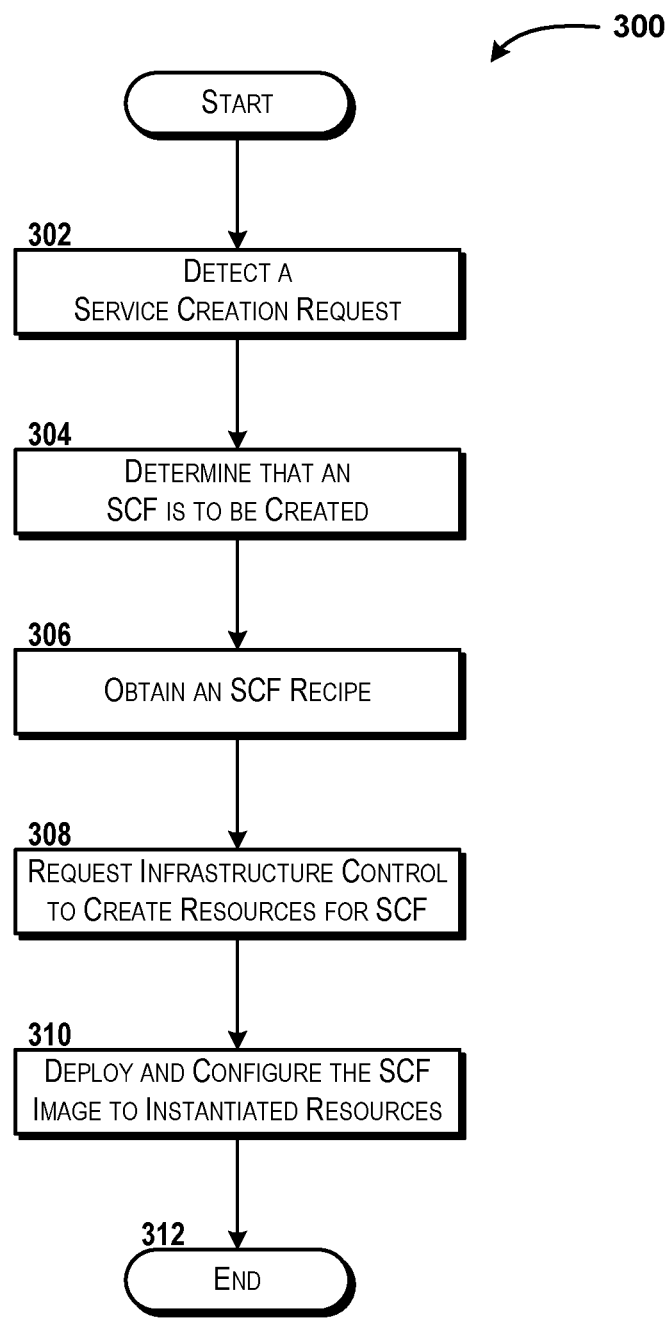
FIG. 3 is a flow diagram showing aspects of a method for deploying a service control function, according to an illustrative embodiment of the concepts and technologies described herein.

Turning now to FIG. 3, aspects of a method 300 for deploying a service control function will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the control system 102 and/or other computing devices that can host the service control function 200 and/or various other elements of the service control 122 illustrated and described herein, to perform one or more operations and/or to cause the processor to direct other components of the computing system or device to perform one or more of the operations.

For purposes of illustrating and describing the concepts of the present disclosure, the methods disclosed herein are described as being performed by the control system 102 via execution of one or more software modules such as, for example, the service control function 200. It should be understood that additional and/or alternative devices and/or network nodes can provide the functionality described herein via execution of one or more modules, applications, and/or other software including, but not limited to, the service control function 200. Thus, the illustrated embodiments are illustrative, and should not be viewed as being limiting in any way.

The method 300 begins at operation 302. At operation 302, the control system 102 can detect a service creation request. It should be understood that the control system 102 can detect the request in operation 302 or receive the request in operation 302. The request received or detected in operation 302 can correspond to a request for creation of the new service 134, information detailing what features are to be included in the service 134 being requested, combinations thereof, or the like. In response to detecting or receiving or otherwise obtaining the request in operation 302, the control system 102 (or components thereof such as the operations management controller 106) can access one or more recipes, which can include or define policy rules to determine how a service 134 such as the new service 134 requested by way of the request detected or received in operation 302 is to be created, hosted, and/or executed.

The policies and/or rules of the recipes also can indicate the various requirements and/or features of the service 134, as well as an architecture for the service 134, a list of resources used to provide the service 134, and/or an operational framework associated with the service 134. The recipes also can specify a service control function 200 and/or combination of two or more service control functions 200 and/or a hierarchy of service control functions 200, 218, 220 that will be used to provide the requested service 134. It should be understood that this example is illustrative and therefore should not be construed as being limiting in any way.

From operation 302, the method 300 proceeds to operation 304. At operation 304, the control system 102 can determine that a service control function 200 is to be created for the service requested in operation 302. As noted above, the control system 102 can determine, according to various embodiments, that the service control function 200 (and/or hierarchy of service control functions 200, 218, 220) that are to support the service 134 do not exist. This determination can be based upon analysis of the service recipes 210, the service inventory 208, the inventory 110, and/or other information. It can be appreciated that if the control system 102 instead determined that the service control functions 200 and/or hierarchy of service control functions 200, 218, 220 did exist, the service control functions 200 and/or hierarchy of service control functions 200, 218, 220 could be allocated or assigned instead of being created as illustrated and described herein. It therefore should be understood that this example is illustrative and therefore should not be construed as being limiting in any way.

Although not separately shown in FIG. 3, it should be understood that the control system 102 can determine if the control system 102 can communicate with the infrastructure 114 as part of operation 304. The control system 102 also can determine if networking resources are available to support communications needed to create the service control functions 200, 218, 220, or the like. If the communications and/or resources are not supported and/or available, the control system 102 can request and/or initiate their creation. It should be understood that this example is illustrative and therefore should not be construed as being limiting in any way.

From operation 304, the method 300 proceeds to operation 306. At operation 306, the control system 102 can obtain a recipe for a service control function 200. In particular, the control system 102 can access the service recipes 210 to determine how a service control function 200 and/or a hierarchy of service control functions 200, 218, 220 should be created for the service 134 requested in operation 302. The service recipes 210 can specify how many service control functions 200, 218, 220 are to be created, a hierarchy among the service control functions 200, 218, 220 (if any), combinations thereof, or the like.

From operation 306, the method 300 proceeds to operation 308. At operation 308, the control system 102 can request infrastructure control 112 to create infrastructure resources for the service control function 200 (or hierarchy of service control functions 200, 218, 220) identified or determined in operation 306. According to various embodiments, the control system 102 can use the service recipes 210 and/or other recipes to identify the infrastructure 114 that will be used to support the service control functions 200 and/or hierarchy of service control functions 200, 218, 220. Because the infrastructure for the service control functions 200 and/or hierarchy of service control functions 200, 218, 220 can be identified in additional and/or alternative manners, it should be understood that this example is illustrative and therefore should not be construed as being limiting in any way.

From operation 308, the method 300 proceeds to operation 310. At operation 310, the control system 102 can deploy and configure the service control function 200 to the resources instantiated by the infrastructure 114. It should be understood that the control system 102 can initiate the deployment and configuration of the service control functions 200 and/or hierarchy of service control functions 200, 218, 220 or perform the deployment and/or configuration of the service control functions 200 and/or hierarchy of service control functions 200, 218, 220. As such, it should be understood that the illustrated embodiment is illustrative of some embodiments and should not be construed as being limiting in any way.

From operation 310, the method 300 proceeds to operation 312. The method 300 ends at operation 312.

Figure 4:
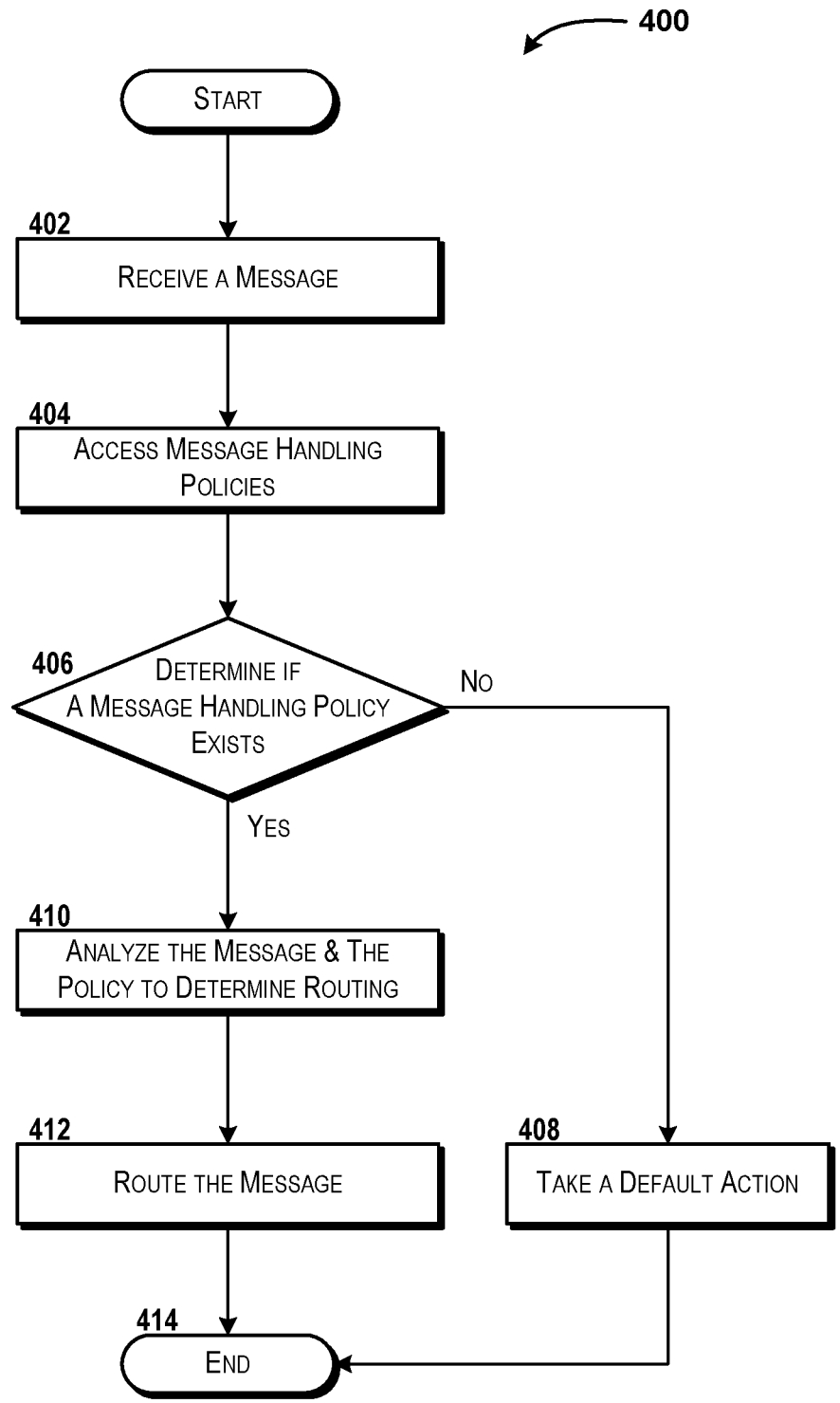
FIG. 4 is a flow diagram showing aspects of a method for providing message handling at a service control function, according to an illustrative embodiment of the concepts and technologies described herein.

Turning now to FIG. 4, aspects of a method 400 for providing message handling at a service control function 200 will be described in detail, according to an illustrative embodiment. The method 400 begins at operation 402. At operation 402, the control system 102 can receive a message. According to various embodiments, the message can be received from various entities including, but not limited to, one or more EMFs 130, one or more VSF management functions 132, one or more VSFs 124, one or more lower level service control functions 220, combinations thereof, or the like.

According to various embodiments, the message can be received at the adapter function 206 executed and/or hosted by the service control function 200 and/or the control system 102. The adapter function 206 can translate or modify the message for use within the service control function 200 and/or the control system 102. It can be appreciated that the adapter function 206 can include one or more application programming interfaces ("APIs"), API handlers, and/or API translators for translating the message received in operation 402 from a first format into a second format, or the like. Because other types of translations and/or adaptations are possible and are contemplated as illustrated and described hereinabove, it should be understood that these examples are illustrative and therefore should not be construed as being limiting in any way.

From operation 402, the method 400 proceeds to operation 404. At operation 404, the control system 102 can access one or more message handling policies. It should be appreciated that the message handling policies can be included in or as a part of the service policies 212. As such, in operation 404 the control system 102 can access or analyze the service policies 212 to access or analyze one or more message handling policies.

From operation 404, the method 400 proceeds to operation 406. At operation 406, the control system 102 can determine if a message handling policy exists for handling the message received in operation 402. The control system 102 can search or analyze the service policies 212 to determine if the message or message type received in operation 402 is described or addressed by one or more of the message handling policies embodied by the service policies 212. This determination can be made by determining a message type or other information and comparing that information to the message handling policies included in or embodied by the service policies 212. Because the control system 102 can determine if a message handling policy exists in additional and/or alternative ways, it should be understood that this example is illustrative and therefore should not be construed as being limiting in any way.

If the control system 102 determines, in operation 406, that one or more message handling policies relating to the message received in operation 402 do not exist or are not available, the method 400 can proceed to operation 408. At operation 408, the control system 102 can take some default action with respect to the message. The default action can include routing to an alternative destination as well as and/or in addition to dropping or ignoring the message, responding to the message with an error, storing the message, reporting or forwarding the message to the service analytics 214 and/or the common DCAE 216, combinations thereof, or the like. The alternative destination also can include, for example, a higher level service control function 218, a master operations management function such as, for example, the operations management controller 106, and/or other higher level functions or devices. Thus, it can be appreciated that the message can be forwarded to other entities in operation 408, and that the other entities can perform other forwarding operations.

Returning to operation 406, if the control system 102 determines that one or more message handling policies relating to the message received in operation 402 do exist or are available, the method 400 can instead proceed from operation 406 to operation 410. At operation 410, the control system 102 can analyze the message received in operation 402 and one or more message handling policies determined to exist in operation 406 to determine routing for the message.

The message handling policies can specify, for example, that the message is to be routed to the service controller 202, that the message is to be routed to the service analytics 214, and/or that the message is to be routed to both the service controller 202 and the service analytics 214. Because the message handling policies can specify additional and/or alternative destinations for the message, it should be understood that this example is illustrative and therefore should not be construed as being limiting in any way.

From operation 410, the method 400 proceeds to operation 412. At operation 412, the control system 102 can route the message received in operation 402. The control system 102 can route the message in accordance with the routing determined in operation 410. Thus, the control system 102, or the message handler 204 hosted or executed by the control system 102, can route the message to the service controller 202, the service analytics 214, other destinations, and/or combinations thereof.

From operation 412, the method 400 proceeds to operation 414. The method 400 ends at operation 414.

Figure 5:
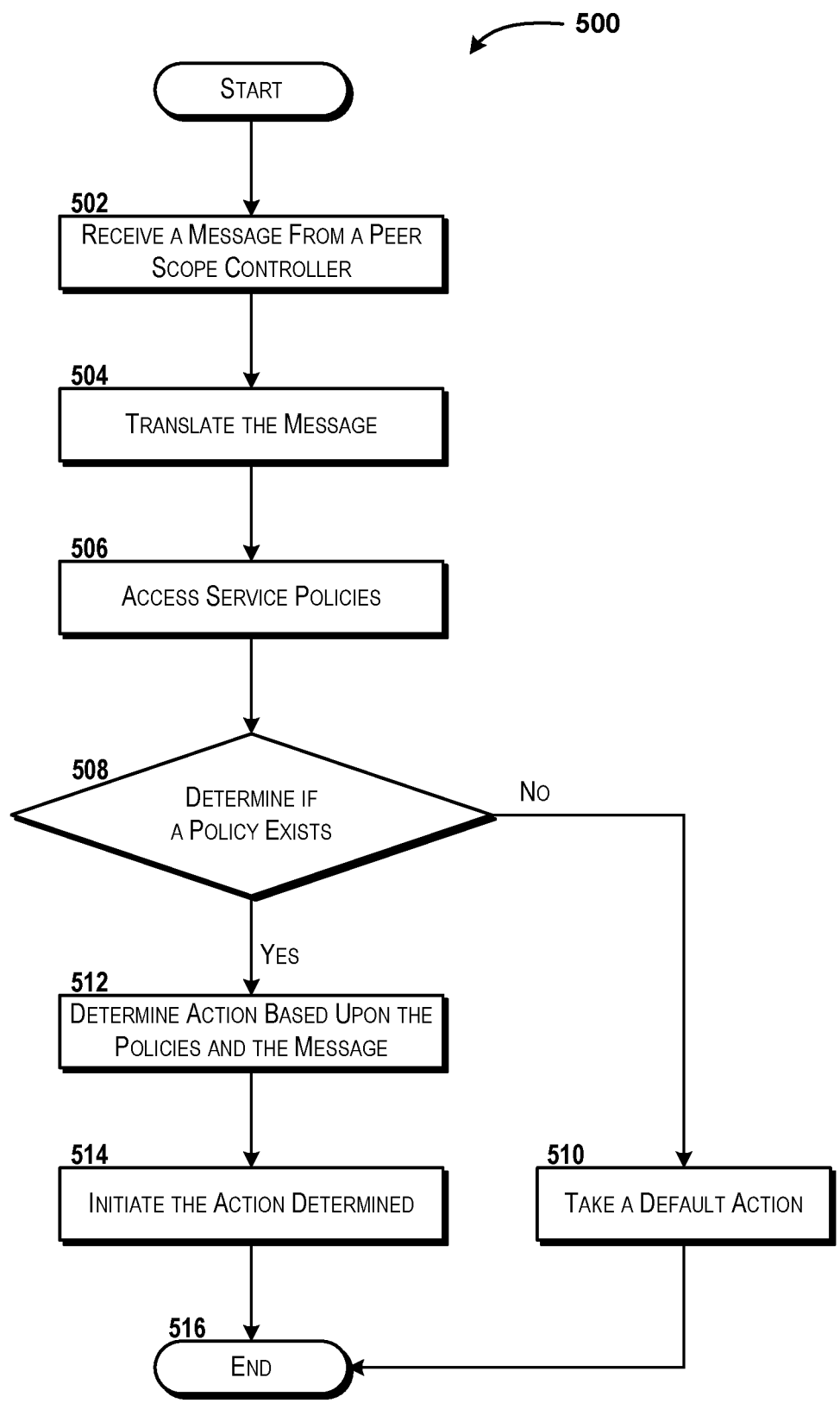
FIG. 5 is a flow diagram showing aspects of a method for providing message handling at a service control function for peer scope controller messages, according to an illustrative embodiment of the concepts and technologies described herein.

Turning now to FIG. 5, aspects of a method 500 for providing message handling at a service control function for peer scope controller messages will be described in detail, according to an illustrative embodiment. The method 500 begins at operation 502. At operation 502, the control system 102 can receive a message. The message received in operation 502 can be received from one or more of various peer scope controllers including, but not limited to, an infrastructure controller within infrastructure control 112, a network controller within network control 118, combinations thereof, or the like.

From operation 502, the method 500 proceeds to operation 504. At operation 504, the control system 102 can translate or adapt the message received in operation 502 for use within the service control function 200 and/or the control system 102 that can host or execute the service control function 200. In particular, the message received in operation 502 can be received at the adapter function 206 executed and/or hosted by the service control function 200 and/or the control system 102. As explained above, the adapter function 206 can translate or modify the message for use within the service control function 200 and/or the control system 102.

From operation 504, the method 500 proceeds to operation 506. At operation 506, the control system 102 can access and/or analyze the service policies 212. From operation 506, the method 500 proceeds to operation 508. At operation 508, the control system 102 can determine if a service policy 212 exists for the message received in operation 502. In particular, the control system 102 can search or analyze the service policies 212 to determine if the message or message type received in operation 502 is described or addressed by one or more of the policies embodied by the service policies 212. Because the control system 102 can determine if a service policy 212 exists in additional and/or alternative ways, it should be understood that this example is illustrative and therefore should not be construed as being limiting in any way.

If the control system 102 determines, in operation 508, that one or more service policies 212 relating to the message received in operation 502 do not exist or are not available, the method 500 can proceed to operation 510. At operation 510, the control system 102 can take a default action. The default action can include routing the message north (or up) to an alternative destination, ignoring or "dropping" the message, storing the message for future analysis and/or use, responding to the message with an error, reporting or forwarding the message, or the like. Because other actions can be taken by default, it should be understood that these examples are illustrative and should not be construed as being limiting in any way.

Returning to operation 508, if the control system 102 determines that one or more service policies 212 relating to the message received in operation 502 do exist or are available, the method 500 can proceed from operation 508 to operation 512. At operation 512, the control system 102 can analyze the message received in operation 502 and one or more of the service policies 212 determined to exist in operation 508 to determine an action to take with respect to or in response to the message received in operation 502. For example, the control system 102 can determine, in operation 512, that a service 134 should be moved to new infrastructure 114 in response to receiving a message from the infrastructure control 112 that new resources have been instantiated (e.g., to host the service 134 after failure of other infrastructure). By way of another example, the control system 102 can determine, in operation 512, that new or alternative network transport should be used to support the service 134 in response to receiving a message from the network control 118 that new network transport and/or other resources have been created, allocated, instantiated, or the like. It should be understood that these examples are illustrative and therefore should not be construed as being limiting in any way.

From operation 512, the method 500 proceeds to operation 514. At operation 514, the control system 102 can initiate the action determined in operation 512 (for example, by execution of the service controller 202). Thus, in operation 514, the control system 102 can modify the service 134 and/or one or more components thereof (e.g., the VSFs 124, the EMFs 130, the VSF management functions 132, or the like), initiate reassignment or relocation of one or more components of the service 134, change messaging rules or policies, modify the service inventory 208 and/or the inventory 110, route messages or events to the service DCAE and/or components thereof (e.g., the message handler 204 and/or the service analytics 214), notify the service controller 202 of changes or events, combinations thereof, or the like. Because additional and/or alternative actions are possible and are contemplated, it should be understood that these examples are illustrative and therefore should not be construed as being limiting in any way.

From operation 514, the method 500 proceeds to operation 516. The method 500 ends at operation 516.

Figure 6:
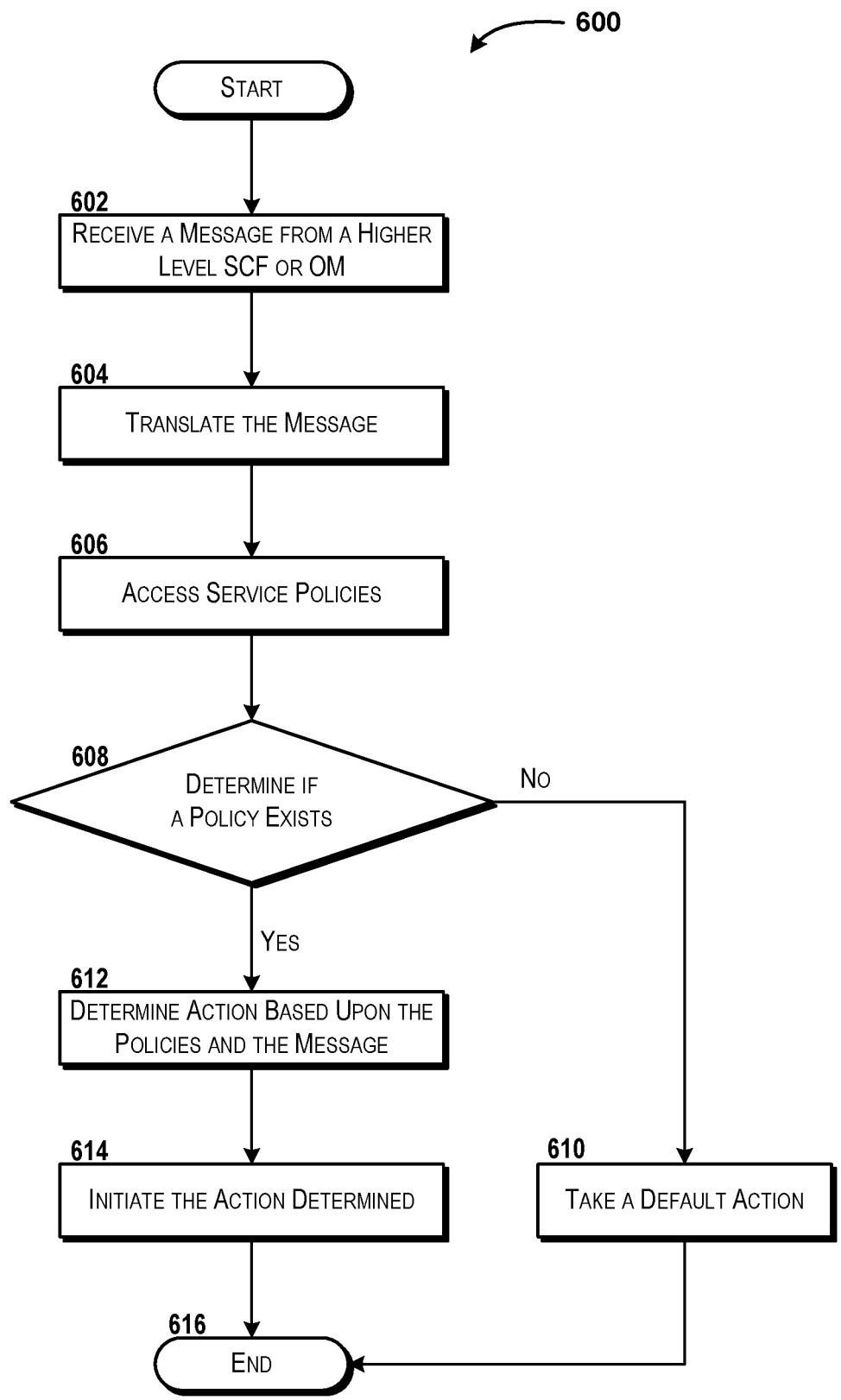
FIG. 6 is a flow diagram showing aspects of a method for providing message handling at a service control function for higher-level element messages, according to an illustrative embodiment of the concepts and technologies described herein.

Turning now to FIG. 6, aspects of a method 600 for providing message handling at a service control function 200 for higher-level element messages will be described in detail, according to an illustrative embodiment. The method 600 begins at operation 602. At operation 602, the control system 102 can receive a message. The message received in operation 602 can be received from one or more higher-level elements within service control 122, the control system 102, and/or elsewhere. In various embodiments, the message received in operation 602 can be received from a higher level service control function 218, an operations management function such as the operations management controller 106, combinations thereof, or the like.

From operation 602, the method 600 proceeds to operation 604. At operation 604, the control system 102 can translate or adapt the message received in operation 602 for use within the service control function 200 and/or the control system 102 that can host or execute the service control function 200. In particular, the message received in operation 602 can be received at the adapter function 206 executed and/or hosted by the service control function 200 and/or the control system 102. As explained above, the adapter function 206 can translate or modify the message for use within the service control function 200 and/or the control system 102.

From operation 604, the method 600 proceeds to operation 606. At operation 606, the control system 102 can access and/or analyze the service policies 212. From operation 606, the method 600 proceeds to operation 608. At operation 608, the control system 102 can determine if a service policy 212 exists for the message received in operation 602. In particular, the control system 102 can search or analyze the service policies 212 to determine if the message or message type received in operation 602 is described or addressed by one or more of the policies embodied by the service policies 212. Because the control system 102 can determine if a service policy 212 exists in additional and/or alternative ways, it should be understood that this example is illustrative and therefore should not be construed as being limiting in any way.

If the control system 102 determines, in operation 608, that one or more service policies 212 relating to the message received in operation 602 do not exist or are not available, the method 600 can proceed to operation 610. At operation 610, the control system 102 can take a default action. The default action can include ignoring or "dropping" the message, storing the message for future analysis and/or use, responding to the message with an error, reporting or forwarding the message, routing the message to other elements or destinations, combinations thereof, or the like. Because other actions can be taken by default, it should be understood that these examples are illustrative and should not be construed as being limiting in any way.

Returning to operation 608, if the control system 102 determines that one or more service policies 212 relating to the message received in operation 602 do exist or are available, the method 600 can proceed from operation 608 to operation 612. At operation 612, the control system 102 can analyze the message received in operation 602 and one or more of the service policies 212 determined to exist in operation 608 to determine an action to take with respect to or in response to the message received in operation 602. It should be appreciated that the functionality of the control system 102 with respect to operation 612 can be, but is not necessarily, similar or even identical to the functionality of the control system 102 illustrated and described above with reference to operation 512 in FIG. 5.

For example, the control system 102 can determine, in operation 612, that a service 134 should be moved, that network transport should be modified for the service 134, that messaging functions should be changed or modified, that policies should be modified, combinations thereof, or the like. Because additional and/or alternative actions can be determined in operation 612, it should be understood that these examples are illustrative and therefore should not be construed as being limiting in any way.

From operation 612, the method 600 proceeds to operation 614. At operation 614, the control system 102 can initiate the action determined in operation 612. It should be appreciated that the functionality of the control system 102 with respect to operation 614 can be, but is not necessarily, similar or even identical to the functionality of the control system 102 illustrated and described above with reference to operation 514 in FIG. 5. As such, the control system 102 can modify or initiate modification of the service 134 and/or one or more components thereof; reassign, relocate, and/or initiate reassignment or relocation of one or more components of the service 134; change or initiate changing of one or more messaging rules or policies; modify or initiate modification of the service inventory 208 and/or the inventory 110; route or initiate routing of one or more messages or events to the service DCAE, the common DCAE 216 and/or components thereof; notify or initiate notification of the service controller 202 of changes; combinations thereof; or the like. Because additional and/or alternative actions are possible and are contemplated, it should be understood that these examples are illustrative and therefore should not be construed as being limiting in any way.

From operation 614, the method 600 proceeds to operation 616. The method 600 ends at operation 616.

Figure 7:
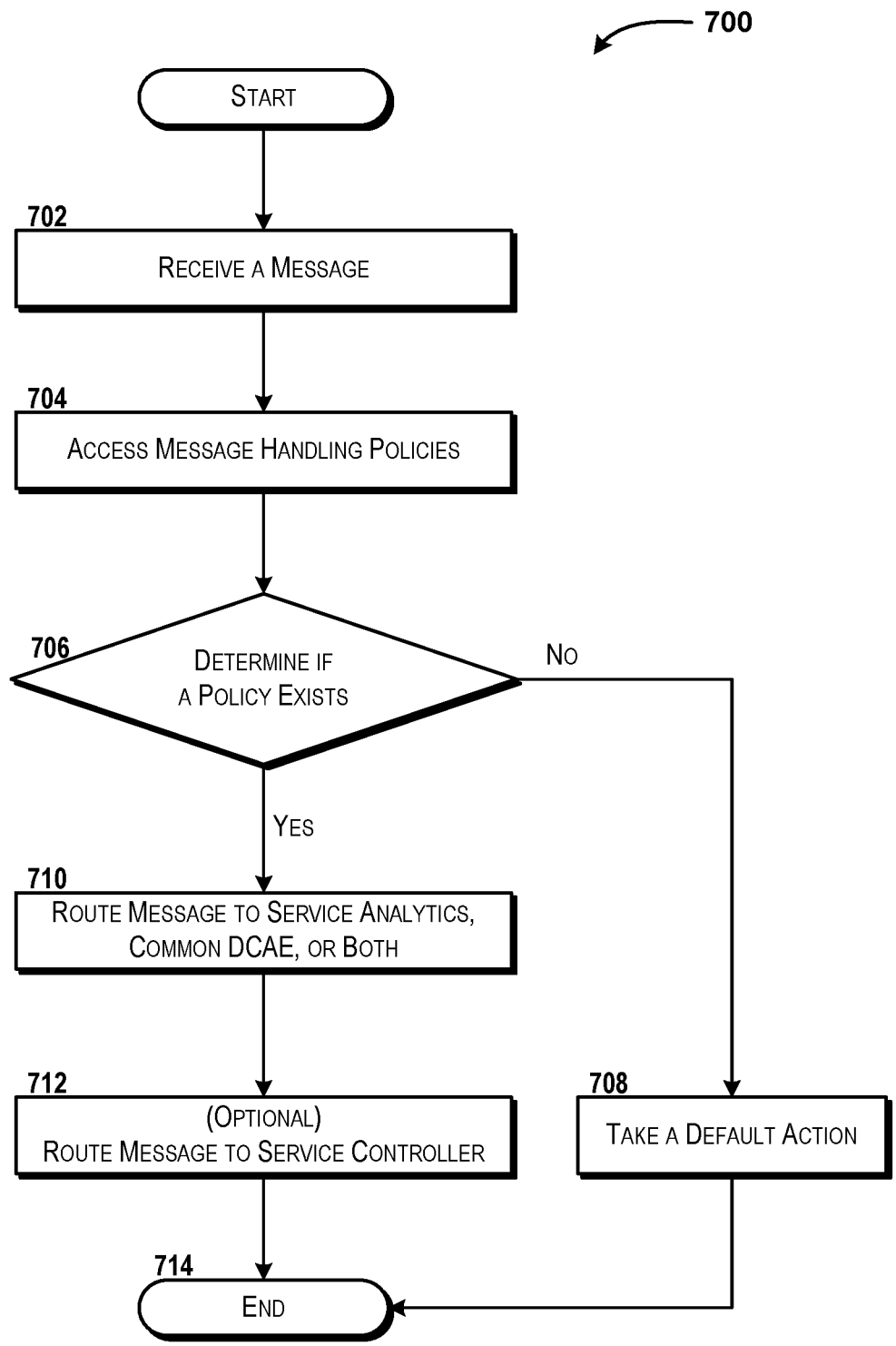
FIG. 7 is a flow diagram showing aspects of a method for executing a data collection, analytics, and event handling process at a service control function, according to an illustrative embodiment of the concepts and technologies described herein.

Turning now to FIG. 7, aspects of a method 700 for executing a data collection, analytics, and event handling ("DCAE") process at a service control function 200 will be described in detail, according to an illustrative embodiment. It should be understood that the method 700 can be performed in conjunction with other message handling processes illustrated and described herein, though this is not necessarily the case.

The method 700 begins at operation 702. At operation 702, the control system 102 can receive a message. According to various embodiments, the message can be received from various entities including, but not limited to, one or more lower-level entities such as EMFs 130, VSF management functions 132, VSFs 124, lower level service control functions 220, combinations thereof, or the like; one or more higher-level entities such as higher level service control functions 218, the operations management controller 106 and/or other operations management functions or entities; one or more peer entities such as an entity within infrastructure control 112 and/or network control 118; combinations thereof; or the like.

According to various embodiments, the message received in operation 702 can be received at the adapter function 206 executed and/or hosted by the service control function 200 and/or the control system 102 as explained above. The adapter function 206 can translate or modify the message for use within the service control function 200 and/or the control system 102.

From operation 702, the method 700 proceeds to operation 704. At operation 704, the control system 102 can access one or more message handling policies for DCAE functions. Thus, it can be appreciated that the functionality of the control system 102 illustrated and described herein with reference to operation 704 can complement and/or supplement other message handling policy searches and/or analysis for handling messages and/or determination actions based upon the messages. As such, in operation 704 the control system 102 can access or analyze the service policies 212 to access or analyze one or more message handling policies that relate to DCAE processes in addition to, or instead of, other types of message handling policies. Because the DCAE message handling policies can be stored separately from other service policies 212 and/or message handling policies in some embodiments, it should be understood that this example is illustrative and therefore should not be construed as being limiting in any way.

From operation 704, the method 700 proceeds to operation 706. At operation 706, the control system 102 can determine if a DCAE message handling policy exists for the message received in operation 702. In particular, the control system 102 can be configured to search or analyze the service policies 212 and/or one or more DCAE message handling policies to determine if a DCAE message handling policy is relevant to or relates to the message or message type received in operation 702. The control system 102 can be make this determination by determining a message type or other information and comparing that information to the DCAE message handling policies included in or embodied by the service policies 212 or message handling policies. Because the control system 102 can determine if a DCAE message handling policy exists in additional and/or alternative ways, it should be understood that this example is illustrative and therefore should not be construed as being limiting in any way.

If the control system 102 determines, in operation 706, that one or more DCAE message handling policies relating to the message received in operation 702 do not exist or are not available, the method 700 can proceed to operation 708. At operation 708, the control system 102 can take a default action. The default action can include routing the message to an alternative recipient, element, or other destination; ignoring or "dropping" the message; storing the message for future analysis and/or use; responding to the message with an error; reporting or forwarding the message; combinations thereof, or the like. Because other actions can be taken by default, it should be understood that these examples are illustrative and should not be construed as being limiting in any way.

If the control system 102 instead determines, in operation 706, that one or more DCAE message handling policies relating to the message received in operation 702 exist or are available, the method 700 can proceed to operation 710. At operation 710, the control system 102 can analyze the message received in operation 702 and the one or more DCAE message handling policies determined to exist in operation 706 to determine routing for the message.

The DCAE message handling policies can specify, for example, that the message is to be routed to the service DCAE (e.g., the service analytics 214 component of the service DCAE), that the message is to be routed to the common DCAE 216, and/or that the message is to be routed to one or more of the service DCAE and/or the common DCAE 216. The DCAE message handling policies also can specify that the message should additionally be routed to the service controller 202, as will be explained in more detail below with reference to operation 712. Because the DCAE message handling policies can specify additional and/or alternative destinations for the message, it should be understood that this example is illustrative and therefore should not be construed as being limiting in any way.

From operation 710, the method 700 proceeds to operation 712. At operation 712, the control system 102 can route the message received in operation 702 to the service analytics 214 and/or to the common DCAE 216 via the service analytics 214. In particular, in some embodiments, the service analytics 214 can receive the message and route the message to the common DCAE 216, do nothing with the message, execute some default behavior, and/or take other actions.

From operation 712, the method 700 can proceed to operation 714. The control system 102 optionally can route the message to the service controller 202. In some embodiments, the service controller 202 can route the message to the operations management controller 106, and the operations management controller 106 can route the message to another destination. For example, the operations management controller 106 may route the message to an entity within another scope such as, for example, an infrastructure scope, a network scope, or the like. The operations management controller 106 also may route the message to the common DCAE 216 or other entities, if desired. Because the message can be routed to additional and/or alternative destinations, and because the destination can be identified in additional and/or alternative manners, it should be understood that this example is illustrative and therefore should not be construed as being limiting in any way.

It should be understood that some DCAE message handling policies may only specify routing to the service DCAE and/or the common DCAE 216. In some embodiments, the service analytics 214 may analyze the message and then access additional message handling policies that may specify, for example, that the message also should be routed to the service controller 202. As such, operation 712 can include a second level of routing that may occur in addition to, or instead of, the routing illustrated with respect to operation 710. Thus, the control system 102, or the message handler 204 hosted or executed by the control system 102, can route the message to the service controller 202, the service analytics 214, the common DCAE 216, other destinations, and/or combinations thereof.

From operation 712, the method 700 proceeds to operation 714. The method 700 ends at operation 714.

Figure 8:
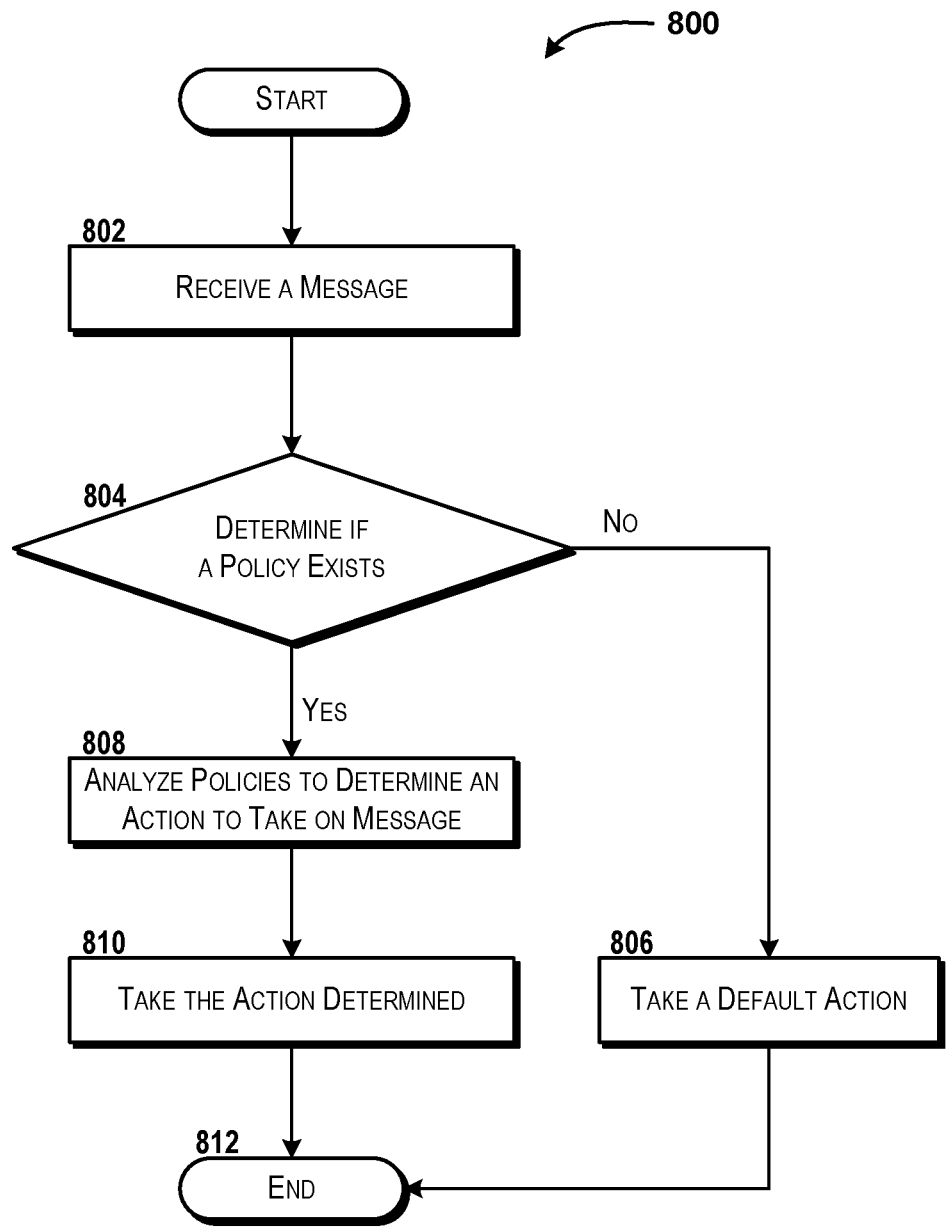
FIG. 8 is a flow diagram showing aspects of a method for providing message handling at a service control function, according to another illustrative embodiment of the concepts and technologies described herein.

Turning now to FIG. 8, aspects of a method 800 for providing message handling at a service control function 200 will be described in detail, according to an illustrative embodiment. While several methods for message handling have been illustrated and described herein, it can be appreciated that the method 800 can provide a general message handling process or method that can be used in accordance with various embodiments of the concepts and technologies described herein.

The method 800 begins at operation 802. At operation 802, the control system 102 can receive a message. The message received in operation 802 can be received from one or more lower-level entities such as EMFs 130, VSF management functions 132, VSFs 124, lower level service control functions 220, combinations thereof, or the like; one or more higher-level entities such as higher level service control functions 218, the operations management controller 106 and/or other operations management functions or entities; one or more peer entities such as an entity within infrastructure control 112 and/or network control 118; combinations thereof; or the like.

Although not separately illustrated in FIG. 8, it should be understood that the control system 102 can translate or adapt the message received in operation 802 for use within the service control function 200 and/or the control system 102 that can host or execute the service control function 200. In particular, the message received in operation 802 can be received at the adapter function 206 executed and/or hosted by the service control function 200 and/or the control system 102.

From operation 802, the method 800 proceeds to operation 804. At operation 804, the control system 102 can determine if a service policy 212 exists for the message received in operation 802. In particular, the control system 102 can search or analyze the service policies 212 to determine if the message or message type received in operation 802 is described or addressed by one or more of the policies embodied by the service policies 212. Because the control system 102 can determine if a service policy 212 exists in additional and/or alternative ways, it should be understood that this example is illustrative and therefore should not be construed as being limiting in any way.

If the control system 102 determines, in operation 804, that one or more service policies 212 relating to the message received in operation 802 do not exist or are not available, the method 800 can proceed to operation 806. At operation 806, the control system 102 can take a default action. The default action can include ignoring or "dropping" the message, storing the message for future analysis and/or use, responding to the message with an error, reporting or forwarding the message, routing the message to other elements or destinations, combinations thereof, or the like. Because other actions can be taken by default, it should be understood that these examples are illustrative and should not be construed as being limiting in any way.

Returning to operation 804, if the control system 102 determines that one or more service policies 212 relating to the message received in operation 802 do exist or are available, the method 800 can proceed from operation 804 to operation 808. At operation 808, the control system 102 can analyze the message received in operation 802 and one or more of the service policies 212 determined to exist in operation 804 to determine an action to take with respect to or in response to the message received in operation 802. For example, the control system 102 can determine, in operation 808, that a service 134 should be moved to new infrastructure 114, that new resources should be instantiated, that new or alternative network transport should be used to support the service 134, that scaling should be performed for the service 134 or components thereof, that a DCAE analysis and/or message routing should occur, combinations thereof, or the like. Because other types of actions may be determined in operation 808, it should be understood that these examples are illustrative and therefore should not be construed as being limiting in any way.

From operation 808, the method 800 proceeds to operation 810. At operation 810, the control system 102 can initiate the action determined in operation 808. Thus, in operation 810, the control system 102 can modify the service 134 and/or one or more components thereof, initiate reassignment or relocation of one or more components of the service 134, initiate instantiation of one or more components or resources, initiate changes to messaging rules or policies, initiate modification of the service inventory 208 and/or the inventory 110, initiate routing of messages or events to the service DCAE and/or components thereof, initiate notification of the service controller 202 of changes or events, combinations thereof, or the like. Because additional and/or alternative actions are possible and are contemplated, it should be understood that these examples are illustrative and therefore should not be construed as being limiting in any way.

From operation 810, the method 800 proceeds to operation 812. The method 800 ends at operation 812.

Figure 9:
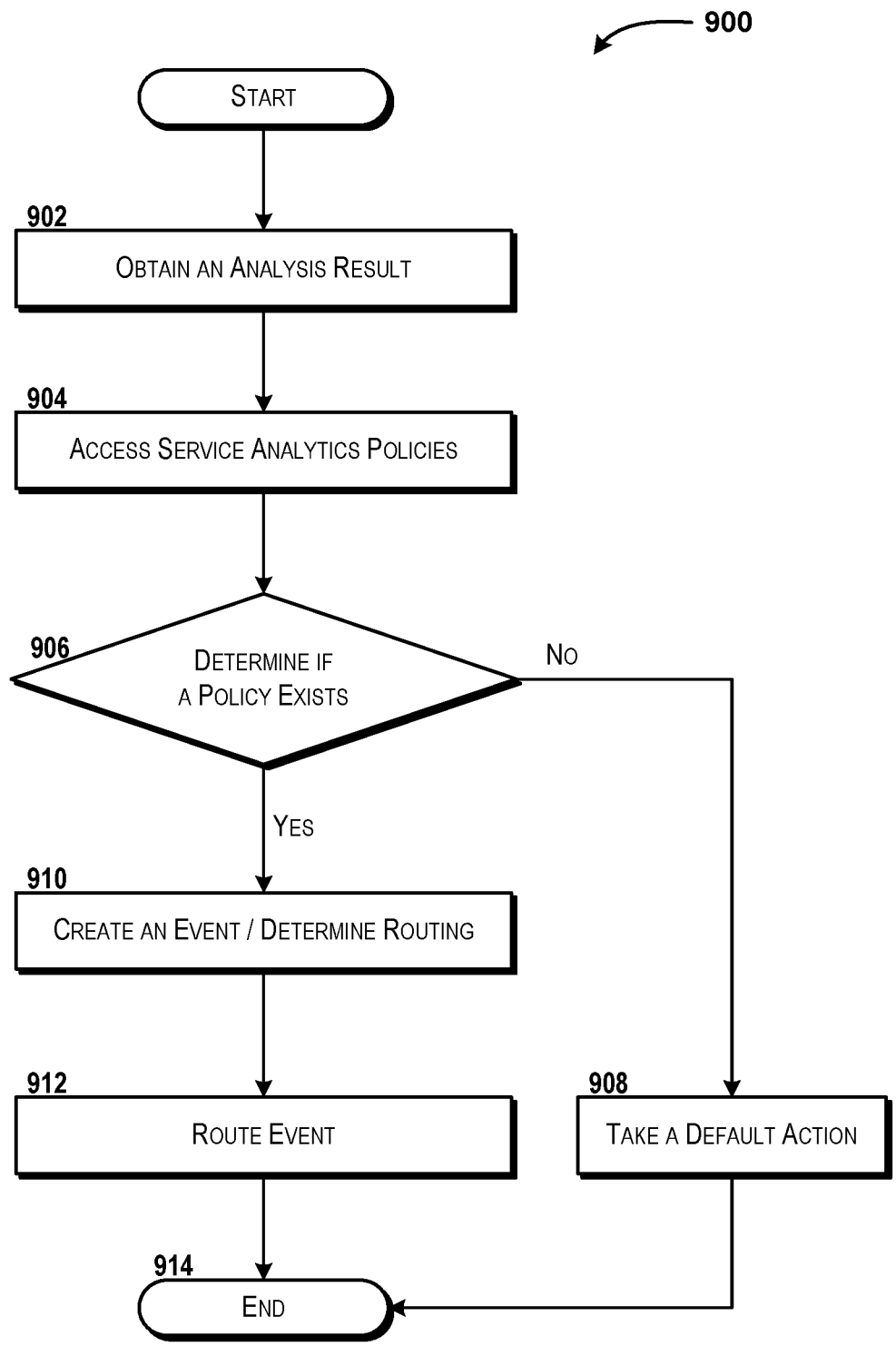
FIG. 9 is a flow diagram showing aspects of a method for creating events at a service control function, according to an illustrative embodiment of the concepts and technologies described herein.

Turning now to FIG. 9, aspects of a method 900 for creating events at a service control function 200 will be described in detail, according to an illustrative embodiment.

It should be understood that the method 900 can be performed in conjunction with other message handling processes illustrated and described herein, though this is not necessarily the case.

The method 900 begins at operation 902. At operation 902, the control system 102 can obtain an analysis result. It can be appreciated that the analysis result obtained in operation 902 can be obtained at a service analytics 214, and that the analysis result can be an output or data stored as a result of analyzing a message as illustrated and described above with reference to FIGS. 4-8.

From operation 902, the method 900 proceeds to operation 904. At operation 904, the control system 102 can access one or more service analytics polices or other service policies 212. From operation 904, the method 900 proceeds to operation 906. At operation 906, the control system 102 can determine if a service analytics policy exists for the analysis result obtained in operation 902. In particular, the control system 102 can be configured to search or analyze the service analytics policies to determine if a policy exists that is relevant to or relates to the analysis result obtained in operation 902. The control system 102 can be make this determination by determining a result, a result type, or other information and comparing that information to the service analytics policies included in or embodied by the service policies 212. Because the control system 102 can determine if a service analytics policy exists in additional and/or alternative ways, it should be understood that this example is illustrative and therefore should not be construed as being limiting in any way.

If the control system 102 determines, in operation 906, that one or more service analytics policies relating to the message received in operation 902 do not exist or are not available, the method 900 can proceed to operation 908. At operation 908, the control system 102 can take a default action. The default action can include doing nothing with the analysis result, storing the analysis result for future use and/or further analysis, other actions, combinations thereof, or the like. Because other actions can be taken by default, it should be understood that these examples are illustrative and should not be construed as being limiting in any way.

If the control system 102 instead determines, in operation 906, that one or more service analytics policies relating to the analysis result obtained in operation 902 exist or are available, the method 900 can proceed to operation 910. At operation 910, the control system 102 can analyze the analysis result obtained in operation 902 and the one or more service analytics policies determined to exist in operation 906 to create an event and/or determine routing for the event created based upon the analysis result.

The event can include a message that can be routed to the service controller 202, the common DCAE 216, or both. It should be understood that the event can include a message that can be routed to other destinations such as, for example, an infrastructure controller included in the infrastructure control 112, a network controller included in the network control 118, other destinations, combinations thereof, or the like. From operation 910, the method 900 proceeds to operation 912. At operation 912, the control system 102 can route the event created in operation 910 to the service controller 202, the common DCAE 216, or both in accordance with the routing determined in operation 910.

From operation 912, the method 900 proceeds to operation 914. The method 900 ends at operation 914.

Figure 10:
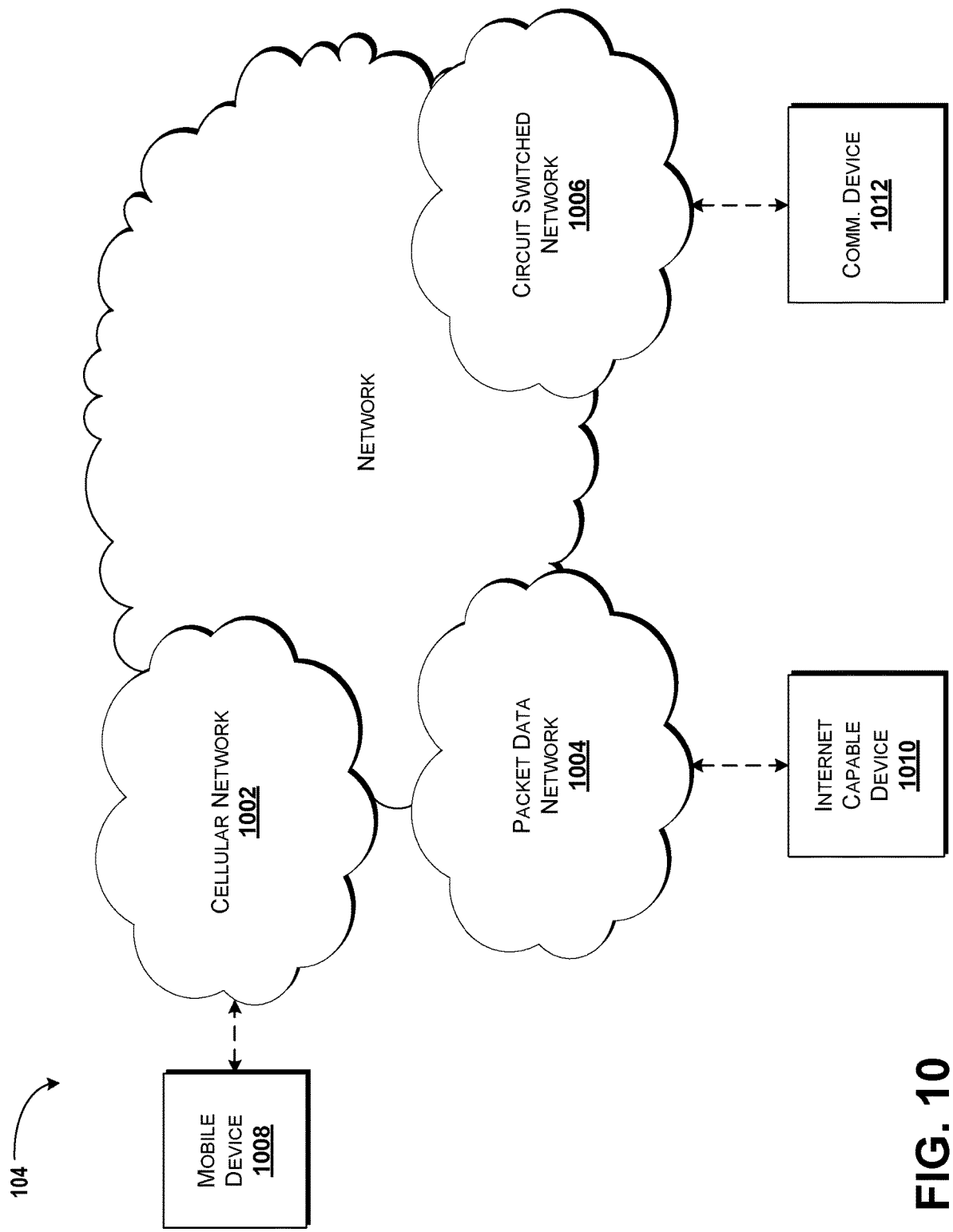
FIG. 10 schematically illustrates a network, according to an illustrative embodiment of the concepts and technologies described herein.

Turning now to FIG. 10, additional details of the network 104 are illustrated, according to an illustrative embodiment. The network 104 includes a cellular network 1002, a packet data network 1004, for example, the Internet, and a circuit switched network 1006, for example, a publicly switched telephone network ("PSTN"). The cellular network 1002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, and combinations thereof, can be operatively connected to the cellular network 1002. The cellular network 1002 can be configured as a 2G GSM network and can provide data communications via GPRS and/or EDGE. Additionally, or alternatively, the cellular network 1002 can be configured as a 3G UMTS network and can provide data communications via the HSPA protocol family, for example, HSDPA, EUL (also referred to as HSDPA), and HSPA+. The cellular network 1002 also is compatible with 4G mobile communications standards as well as evolved and future mobile standards.

The packet data network 1004 includes various devices, for example, servers, computers, databases, and other devices in communication with one another, as is generally known. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a plain old telephone system (POTS). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010. In the specification, the network 104 is used to refer broadly to any combination of the networks 1002, 1004, 1006. It should be appreciated that substantially all of the functionality described with reference to the network 104 can be performed by the cellular network 1002, the packet data network 1004, and/or the circuit switched network 1006, alone or in combination with other networks, network elements, and the like.

Figure 11:
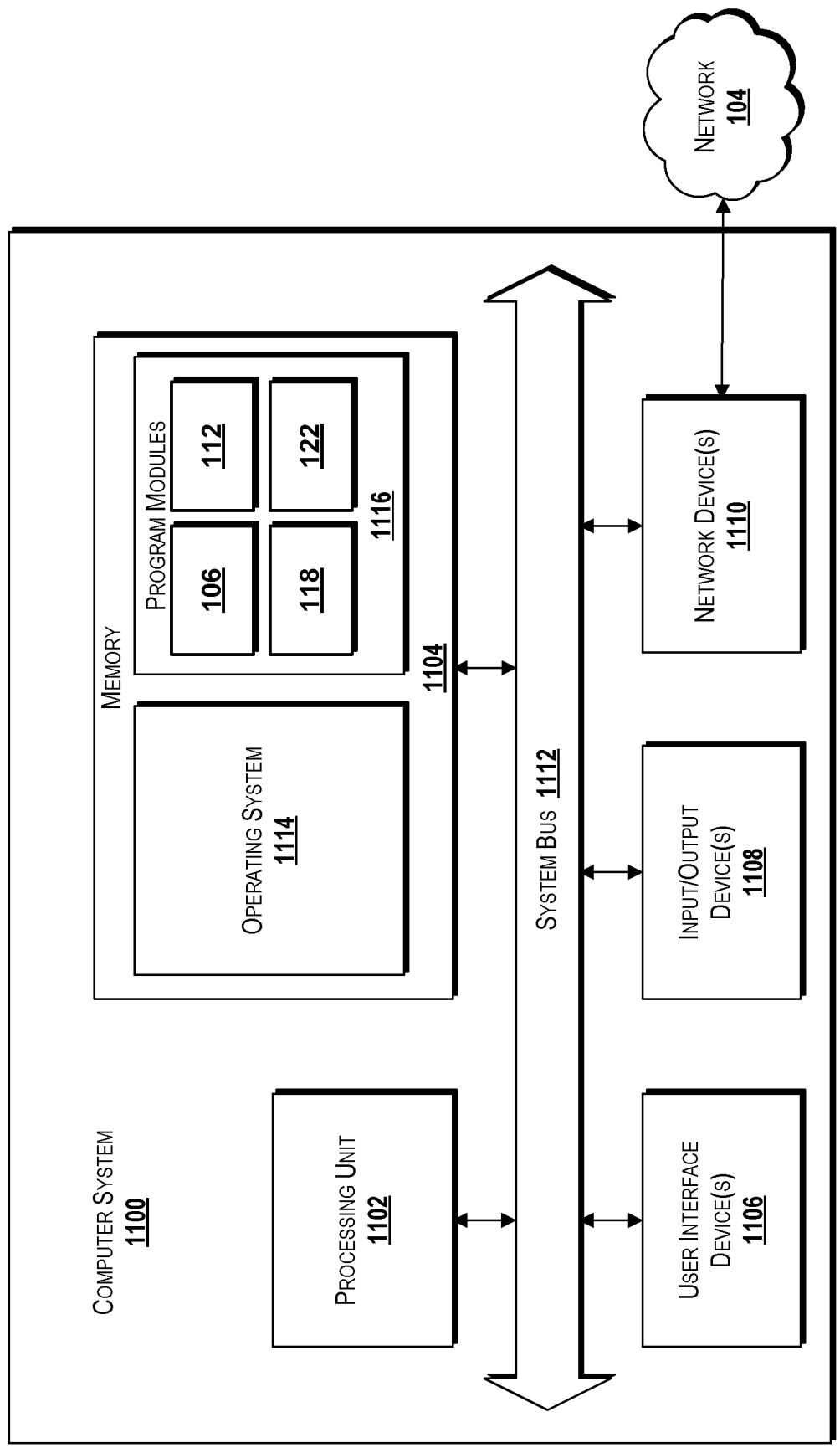
FIG. 11 is a block diagram illustrating an example computer system configured to create, host, interact with, and/or use service control functions, according to some illustrative embodiments of the concepts and technologies described herein.

FIG. 11 is a block diagram illustrating a computer system 1100 configured to provide the functionality described herein for creating and using service control functions, in accordance with various embodiments of the concepts and technologies disclosed herein. The computer system 1100 includes a processing unit 1102, a memory 1104, one or more user interface devices 1106, one or more input/output ("I/O") devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110.

The processing unit 1102 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 1104 communicates with the processing unit 1102 via the system bus 1112. In some embodiments, the memory 1104 is operatively connected to a memory controller (not shown) that enables communication with the processing unit 1102 via the system bus 1112. The memory 1104 includes an operating system 1114 and one or more program modules 1116. The operating system 1114 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1116 may include various software and/or program modules described herein. In some embodiments, for example, the program modules 1116 include the operations management controller 106, the infrastructure control 112, the network control 118, the service control 122 (and/or the elements thereof as shown in FIG. 2), the service 134 (and/or the components thereof shown in FIG. 1), combinations thereof, or the like. These and/or other programs or modules can be embodied in computer-readable media containing instructions that, when executed by the processing unit 1102, cause the computer system 1100 or one or more components thereof to perform one or more of the methods 300, 400, 500, 600, 700, 800, 900 described in detail above with respect to FIGS. 3-9. According to embodiments, the program modules 1116 may be embodied in hardware, software, firmware, or any combination thereof. Although not shown in FIG. 11, it should be understood that the memory 1104 also can be configured to store the service creation database 108, the inventory 110, higher level service control function 218, the lower level service control function 220, and/or other programs or data, if desired.

By way of example, and not limitation, computer-readable media may include any available computer storage media or communication media that can be accessed by the computer system 1100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1100. In the claims, the phrase "computer storage medium" and variations thereof does not include waves or signals per se and/or communication media.

The user interface devices 1106 may include one or more devices with which a user accesses the computer system 1100. The user interface devices 1106 may include, but are not limited to, computers, servers, personal digital assistants, cellular phones, or any suitable computing devices. The I/O devices 1108 enable a user to interface with the program modules 1116. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, or an electronic stylus. Further, the I/O devices 1108 may include one or more output devices, such as, but not limited to, a display screen or a printer.

The network devices 1110 enable the computer system 1100 to communicate with other networks or remote systems via a network, such as the network 104. Examples of the network devices 1110 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for creating and using service control functions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, at a control system that comprises a processor and a memory, a message that relates to a performance issue associated with a service that is controlled by a service control function that is a component of a service control that is stored in the memory, wherein the message is received from a network scope controller or an infrastructure scope controller;
   determining, by the processor and based on analyzing message handling policies, if there exists a message handling policy that relates to the message;
   if a determination is made that there exists the message handling policy that relates to the message, routing, by the processor, the message in accordance with the message handing policy that relates to the message; and
   if a determination is made that there does not exist the message handling policy that relates to the message, executing, by the processor, a default action specified by a default message handling policy to route the message.

2. The method of claim 1, further comprising:
   translating the message from a first format that is associated with the network scope controller or the infrastructure scope controller to a second format that is associated with the service control.

3. The method of claim 1, wherein the processor communicates with infrastructure using an application programming interface exposed by the service control, and wherein the service is installed on the infrastructure.

4. The method of claim 3, wherein the service comprises a virtual service function, a virtual service function management function, and a network element management function.

5. The method of claim 1, wherein the message is received via an adapter function, wherein the service control comprises a higher level service control function, the service control function, and a lower level service control function, and wherein the service control function comprises the adapter function, a message handler, and a service inventory.

6. The method of claim 1, further comprising:
   accessing, by the processor, service policies that define handling of the message;
   determining, by the processor, an action to take with respect to the message based on contents of the message and based on the service policies; and
   initiating, by the processor, the action based on the determining.

7. The method of claim 1, wherein the service is installed on infrastructure, and wherein the service comprises a virtual service function, a virtual service function management function, and a network element management function.

8. A system comprising:
   a processor; and
   a memory that stores computer-executable instructions that, when executed by the processor, cause the processor to perform operations comprising
      receiving a message that relates to a performance issue associated with a service that is controlled by a service control function that is a component of a service control that is stored in the memory, wherein the message is received from a network scope controller or an infrastructure scope controller,
      determining, based on analyzing message handling policies, if there exists a message handling policy that relates to the message,
      if a determination is made that there exists the message handling policy that relates to the message, routing the message in accordance with the message handing policy that relates to the message, and
      if a determination is made that there does not exist the message handling policy that relates to the message, executing a default action specified by a default message handling policy to route the message.

9. The system of claim 8, wherein the computer-executable instructions, when executed by the processor, cause the processor to perform operations further comprising:
   translating the message from a first format that is associated with the network scope controller or the infrastructure scope controller to a second format that is associated with the service control.

10. The system of claim 8, wherein the computer-executable instructions, when executed by the processor, cause the processor to perform operations further comprising:
    communicating with infrastructure using an application programming interface exposed by the service control, wherein the service is installed on the infrastructure.

11. The system of claim 8, wherein the service is installed on infrastructure, and wherein the service comprises a virtual service function, a virtual service function management function, and a network element management function.

12. The system of claim 8, wherein the message is received via an adapter function, wherein the service control comprises a higher level service control function, the service control function, and a lower level service control function, and wherein the service control function comprises the adapter function, a message handler, and a service inventory.

13. The system of claim 8, wherein the computer-executable instructions, when executed by the processor, cause the processor to perform operations further comprising:

accessing service policies that define handling of the message;

determining an action to take with respect to the message based on contents of the message and based on the service policies; and initiating the action based on the determining.

14. A computer storage medium having stored thereon computer-executable instructions that, when executed by a processor, cause the processor to perform operations comprising:

receiving a message that relates to a performance issue associated with a service that is controlled by a service control function that is a component of a service control, wherein the message is received from a network scope controller or an infrastructure scope controller;

determining, based on analyzing message handling policies, if there exists a message handling policy that relates to the message;

if a determination is made that there exists the message handling policy that relates to the message, routing the message in accordance with the message handing policy that relates to the message; and if a determination is made that there does not exist the message handling policy that relates to the message, executing a default action specified by a default message handling policy to route the message.

15. The computer storage medium of claim 14, wherein the computer-executable instructions, when executed by the processor, cause the processor to perform operations further comprising:

translating the message from a first format that is associated with the network scope controller or the infrastructure scope controller to a second format that is associated with the service control.

16. The computer storage medium of claim 14, wherein the computer-executable instructions, when executed by the processor, cause the processor to perform operations further comprising:

communicating with infrastructure using an application programming interface exposed by the service control, wherein the service is installed on the infrastructure.

17. The computer storage medium of claim 16, wherein the service comprises a virtual service function, a virtual service function management function, and a network element management function.

18. The computer storage medium of claim 14, wherein the service is installed on infrastructure, and wherein the service comprises a virtual service function, a virtual service function management function, and a network element management function.

19. The computer storage medium of claim 14, wherein the message is received via an adapter function, wherein the service control comprises a higher level service control function, the service control function, and a lower level service control function, and wherein the service control function comprises the adapter function, a message handler, and a service inventory.

20. The computer storage medium of claim 14, wherein the computer-executable instructions, when executed by the processor, cause the processor to perform operations further comprising:

accessing service policies that define handling of the message;

determining an action to take with respect to the message based on contents of the message and based on the service policies; and initiating the action based on the determining.

* * * * *